(12) United States Patent
Moesler et al.

(10) Patent No.: US 9,328,963 B2
(45) Date of Patent: May 3, 2016

(54) ENERGY RECOVERY WHEN PROCESSING MATERIALS WITH REACTIVE FLUIDS

(71) Applicant: Renmatix, Inc., King of Prussia, PA (US)

(72) Inventors: Frederick John Moesler, Berwyn, PA (US); Michel Adam Simard, Berwyn, PA (US); Manuk Colakyan, Ardmore, PA (US); Paul Anthony Neilson, Blue Bell, PA (US)

(73) Assignee: Renmatix, Inc., King of Prussia, PA (US)

( * ) Notice: Subject to any disclaimer, the term of this patent is extended or adjusted under 35 U.S.C. 154(b) by 167 days.

(21) Appl. No.: 13/938,824

(22) Filed: Jul. 10, 2013

(65) Prior Publication Data

US 2015/0013937 A1    Jan. 15, 2015

(51) Int. Cl.
*C10G 1/00*    (2006.01)
*F27D 9/00*    (2006.01)
*C08J 3/00*    (2006.01)

(52) U.S. Cl.
CPC ... *F27D 9/00* (2013.01); *C08J 3/00* (2013.01); *F27D 2009/0072* (2013.01); *Y02P 10/143* (2015.11)

(58) Field of Classification Search
CPC .............. C12P 7/00; C12P 7/06; C12P 7/065; C12P 7/08; C12P 7/10; C12P 2203/00; C12P 2201/00; C12P 1/00; C12P 1/02; C12P 1/04; C07C 1/20; C07C 1/22; C07C 1/24; C07C 4/22; F27D 9/00; C10G 1/00; C10G 1/002; C10G 1/008; C10G 1/047; C10G 1/10

USPC ................ 585/240; 165/61, 65, 66
See application file for complete search history.

(56) References Cited

U.S. PATENT DOCUMENTS

| | | | |
|---|---|---|---|
| 4,468,256 | A | 8/1984 | Hinger |
| 5,411,594 | A | 5/1995 | Brelsford |
| 5,628,830 | A | 5/1997 | Brink |
| 6,306,252 | B1 | 10/2001 | Ryham |
| 6,863,004 | B1 | 3/2005 | Randall |
| 7,566,383 | B2 | 7/2009 | Everett et al. |
| 8,017,820 | B2 | 9/2011 | Foody et al. |

(Continued)

FOREIGN PATENT DOCUMENTS

| | | |
|---|---|---|
| WO | 2006024242 | 3/2006 |
| WO | 2007073333 | 6/2007 |

(Continued)

OTHER PUBLICATIONS

International Search Report and Written Opinion mailed on Apr. 11, 2014 for Intl. Pat. App. No. PCT/US2013/049921 filed Jul. 10, 2013 (Applicant-Renmatix, Inc.; Inventors—Moesler et al.) (9 pages).

*Primary Examiner* — In Suk Bullock
*Assistant Examiner* — Philip Louie
(74) *Attorney, Agent, or Firm* — Travis B Gasa; Andrew G Bunn; Ballard Spahr LLP

(57) ABSTRACT

Disclosed are methods and apparatuses for recovering and reusing energy when processing materials with reactive fluids. More particularly, disclosed are methods and apparatuses for recovering and reusing energy from processes in which materials comprising polymers and/or oligomers are treated with a reactive fluid.

28 Claims, 8 Drawing Sheets

(56) References Cited

U.S. PATENT DOCUMENTS

| | | |
|---|---|---|
| 8,057,639 B2 | 11/2011 | Pschorn et al. |
| 2006/0286628 A1 | 12/2006 | Everett et al. |
| 2010/0048884 A1* | 2/2010 | Kilambi .......................... 536/56 |
| 2010/0151550 A1 | 6/2010 | Signes Nunez et al. |
| 2010/0175690 A1* | 7/2010 | Nagahama et al. ............. 127/37 |
| 2010/0216202 A1 | 8/2010 | Fosbol et al. |
| 2010/0236733 A1* | 9/2010 | Tikka et al. .................... 162/68 |
| 2010/0280207 A1 | 11/2010 | Van Derschrick |
| 2011/0073669 A1 | 3/2011 | Minkkinen |
| 2011/0183379 A1 | 7/2011 | Ladisch et al. |
| 2011/0212499 A1* | 9/2011 | Ladisch et al. ................. 435/165 |
| 2011/0240261 A1 | 10/2011 | Ahlbeck et al. |
| 2012/0088892 A1 | 4/2012 | Van Grambezen et al. |
| 2013/0171709 A1* | 7/2013 | Kusuda et al. ................. 435/165 |

FOREIGN PATENT DOCUMENTS

| | | |
|---|---|---|
| WO | 2009158621 | 12/2009 |
| WO | 2012016180 | 2/2012 |
| WO | 2012042840 | 4/2012 |
| WO | 2012042841 | 4/2012 |

* cited by examiner

US 9,328,963 B2

ENERGY RECOVERY WHEN PROCESSING MATERIALS WITH REACTIVE FLUIDS

FIELD OF THE INVENTION

The invention generally relates to recovering and reusing energy when processing materials with reactive fluids. More particularly, the invention relates to methods and apparatuses for recovering and reusing energy from processes in which materials comprising polymers and/or oligomers are treated with a reactive fluid.

BACKGROUND OF THE INVENTION

Reactive fluids, such as sub-critical, near-critical, and/or supercritical fluids, are highly energetic fluids having a high temperature and high pressure. These reactive fluids can be used to treat materials comprising polymers and/or oligomers to decrease the degree of polymerization or oligomerization of the polymers or oligomers in the material. For example, biomass, which typically is composed of natural polymers or oligomers, such as cellulose, hemicellulose, and lignin, or waste feedstocks, which may contain natural or synthetic polymers or oligomers, can be hydrolyzed by treatment with sub-critical, near-critical, and/or supercritical water to produce monomers and/or shorter chain polymers and oligomers.

Generating reactive fluids having a high temperature and high pressure is an energy intensive process. Without effective management of the system, the heat and pressure associated with the reactive fluid will dissipate into the ambient environment during or after treatment of a material, thereby losing the energy associated therewith. To economically operate a system that employs reactive fluids, an energy recovery system may be employed. Although some energy recovery methods and systems are known, not all recovery methods or systems are applicable to systems that employ reactive fluids. Moreover, it is not obvious which methods or systems should be employed to recover energy from processes that treat biomass or waste feedstocks, or how this recovered energy should be redeployed in the energy-originating method or system, or in other co-located or nearby methods or systems. For example, if heat that is recovered from a reactive fluid is not properly reintegrated into the process, undesirable reactions may occur or desirable reactions may not occur at all. Thus, there remains a need in the art for improved methods and systems for recovering and reusing energy when processing materials with reactive fluids.

BRIEF SUMMARY OF THE INVENTION

The invention provides a method comprising, consisting of, or consisting essentially of:
providing a composition at a first temperature and a first pressure, wherein the composition comprises:
  at least one material selected from the group consisting of a polymer, an oligomer, and combinations thereof; and
  a liquid;
optionally, preheating the composition in a first preheating stage to form a preheated composition, wherein the preheated composition is characterized by a second temperature and a second pressure;
heating the composition or the preheated composition with a reactive fluid in a first heating stage to form a heated composition, wherein the reactive fluid is characterized by a third temperature and a third pressure, and the heated composition is characterized by a fourth temperature and a fourth pressure;
wherein the reactive fluid is produced by a process comprising:
  providing a fluid;
  optionally, preheating the fluid in a second preheating stage to produce a preheated fluid having a fifth temperature and a fifth pressure; and
  heating the fluid or the preheated fluid in a second heating stage to produce the reactive fluid; and
cooling the heated composition in a cooling stage to form a cooled composition, wherein the cooled composition is characterized by a sixth temperature and a sixth pressure;
wherein:
the cooled composition comprises one or more reaction products derived from the material;
the cooling stage comprises a first flash evaporation, thereby producing a first flashed vapor and a first flashed composition;
  the first flashed composition is the same as or different from the cooled composition; and
  at least a portion of the first flashed vapor is used to perform a first useful function.

The invention further provides an apparatus, wherein the apparatus comprises, consists of, or consists essentially of:
optionally, a module configured for preheating a composition to form a preheated composition having a second temperature and a second pressure;
wherein the composition comprises:
  at least one material comprising a polymer, an oligomer, or a combination thereof; and
  a liquid;
and wherein the composition has a first temperature and a first pressure;
a reactor configured for reacting the composition or the preheated composition with a reactive fluid to form a heated composition having a fourth temperature and a fourth pressure;
wherein the reactive fluid has a third temperature and a third pressure; a reactive fluid generator comprising:
optionally, a fluid preheater configured for preheating a fluid to produce a preheated fluid having a fifth temperature and a fifth pressure; and
a heater configured for heating the fluid or the preheated fluid to form the reactive fluid;
a first flash unit configured for a first flash evaporation to form a first flashed vapor and a first flashed composition, wherein the first flashed composition has a seventh temperature and a seventh pressure, the seventh temperature is less than the fourth temperature, and at least a portion of the first flashed vapor is used for a first useful function;
optionally, a second flash unit configured for a second flash evaporation to form a second flashed vapor and a second flashed composition, wherein the second flashed composition has an eighth temperature and an eighth pressure, the eighth temperature is less than the fourth temperature, and optionally at least a portion of the second flashed vapor is used for a fourth useful function, wherein the fourth useful function is the same as or different from the first useful function;
optionally, at least one clean vapor exchanger, wherein at least one of the first flashed vapor and the second flashed vapor indirectly provides heat to a clean fluid in the clean vapor exchanger thereby producing a first clean vapor and/or a second clean vapor, respectively, and optionally at least a portion of the first clean vapor and/or the second clean vapor is used for a second useful function and or fifth useful function, respectively, wherein the second useful function is the same as or different from the first, fourth, and/or fifth useful functions; and optionally, at least one indirect heat exchanger comprising a heat transfer fluid, wherein the at least one heat exchanger is configured for indirectly cooling a process stream processed by the apparatus, thereby producing an energized heat transfer fluid, and the energized heat transfer fluid optionally is used for a third useful function, wherein the third useful function is the same as or different from the first, second, fourth, and fifth useful functions.

BRIEF DESCRIPTION OF THE DRAWINGS

The accompanying drawings, which are included to provide a further understanding of the invention and are incorporated in and constitute a part of this specification, illustrate aspects of the invention, and, together with the description, serve to explain the principles of the invention. Dashed lines generally indicate the flow path of energy recovered in the process. In the drawings.

DETAILED DESCRIPTION OF THE INVENTION

Figure 1A:
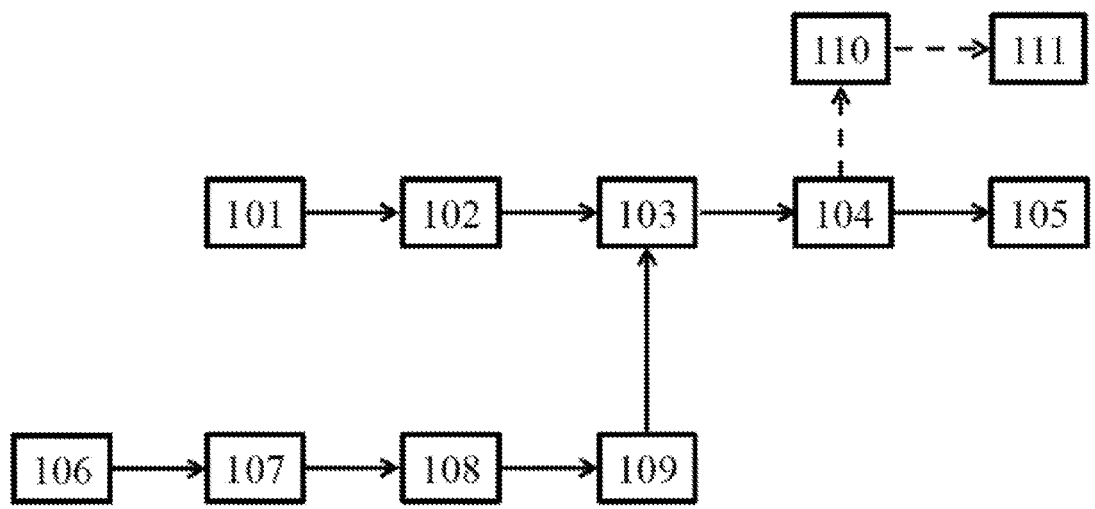
FIG. 1A illustrates an embodiment of a method of the invention, in which at least a portion of the first flashed vapor is used to perform a first useful function.

As employed above and throughout the disclosure, the following terms, unless otherwise indicated, shall be understood to have the following meanings. Other term definitions are explicitly provided throughout the disclosure, or may be implicitly understood by the context of the disclosure.

As used herein, the phrase "substantially free" means have no more than about 1%, preferably less than about 0.5%, or more preferably less than about 0.1%, by weight of a component, based on the total weight of any composition containing the component.

As used herein, the singular forms "a," "an," and "the" include the plural reference unless the context clearly indicates otherwise.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, a "reactive fluid" includes sub-critical, near-critical, and supercritical fluids, as defined herein.

As used herein, "recovered energy" is energy that is recaptured or reclaimed from a system, method, and/or apparatus. Energy (e.g., recovered energy) typically is in the form of heat and/or pressure. For example, recovered heat or thermal energy can be reused for a variety of useful functions as described elsewhere herein, such as to heat other process streams. Moreover, recovered energy in the form of pressure can also be used for a variety of useful functions as described elsewhere herein, such as actuating turbine blades to generate electricity.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (e.g., at least about 100° C., at least about 150° C., at least about 200° C., at least about 250° C.) but typically less than subcritical and at pressures such that water is in a liquid state.

As used herein, a fluid which is "supercritical" (e.g. supercritical water, supercritical ethanol, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, the term "biomass" means a renewable energy source generally comprising carbon-based biological material derived from living or recently-living organisms. The organisms are or may have been plants, animals, fungi, etc. Examples of biomass include, without limitation, wood, lignocellulosic biomass, waste feedstocks, manufacturing waste (wood residues such as sawmill and paper mill discards), agricultural residues (including corn stover, sugarcane bagasse, rice hulls, oat hulls, etc.), food waste, plastic, black liquor (a byproduct of wood pulping processes), etc. Wood can be, for example, hardwood, softwood, annual fibers, and combinations thereof. Biomass typically comprises cellulose, hemicellulose, and lignin. Any suitable type of biomass can be used as a feedstock for the invention described herein. Fossil fuels are generally not considered biomass even though ultimately derived from carbon-based biological material. The term "biomass" as used herein does not include fossil fuel sources.

As used herein, "degree of polymerization" refers to the number of monomeric units in a macromolecule or polymer or oligomer molecule, including those monomeric units that are not identical (such as in an oligomer with different monomeric residues). The degree of polymerization (DP) of the various saccharides in the compositions of the invention may be measured using gel permeation chromatography (GPC), high pressure liquid chromatography (HPLC), such as DIONEX with an electrochemical detector, matrix-assisted laser desorption/ionization time-of-flight (MALDI-TOF) mass spectrometry, or other conventional molecular weight determination methods.

As used herein, "flash evaporation" means a reduction in pressure by means of a valve or other pressure control device, whereby a vapor portion and a residual liquid portion are produced. The vapor portion (i.e., the "flashed vapor") typically exits the system through the valve or other pressure control device, whereas the residual liquid portion (i.e., the "flashed composition") remains fore of the valve or other pressure control device and does not exit therethrough. The vapor portion typically contains at least a portion of a liquid in gaseous form.

As used herein, a "useful function" includes any function having industrial utility. Examples of useful functions include, but are not limited to, active heating, electricity generation (e.g., turbine-generated electricity), feeding to a co-located or nearby plant (e.g., in which the co-located or nearby plant benefits in some manner from the recovered energy), evaporation (e.g., solutions or suspension containing desirable compounds or products can be concentrated by evaporating a solvent or liquid using the recovered energy), clean vapor generation (e.g., using a clean vapor exchanger to produce clean vapor, as described elsewhere herein), vacuum generation (e.g., a vacuum jet), or combinations thereof. Examples of active heating include, e.g., active heating of: compositions (e.g., preheating or heating a composition), liquid media (e.g., preheating or heating a liquid for process streams or refining streams), and/or product streams (e.g., evaporating a liquid for product concentration). Clean vapor production is a useful function as defined herein, because clean vapor has many industrially useful functions. For example, clean vapor can be used to directly heat process streams without introducing any impurities into the system. Passive heat dissipation is an example of a function that is not included in the definition of a "useful function," as used herein.

As used herein, a "co-located plant" is a factory, mill, or other type of manufactory located on the same site, or within about 10 miles of the site, where the energy is produced and recovered. Typically, the flashed vapors or energized heat transfer fluids are fed to a co-located plant by way of piping or other means of conveyance.

As used herein, a "nearby plant" is a factory, mill, or other type of manufactory located about 10 miles to about 100 miles from the location where the energy is produced and recovered. Typically, the flashed vapors or energized heat transfer fluids are fed to a nearby plant by way of piping or other means of conveyance.

As used herein, "preheating" means a lower temperature heating stage that occurs prior to (e.g., immediately prior to) a subsequent higher temperature heating stage.

As used herein, "clean vapor" means a vapor that is substantially free of impurities that are typically present in a flashed vapor (i.e., "dirty vapor") obtained from flash evaporation of a high temperature and high pressure process stream. For example, when processing biomass using reactive fluids, flashed vapors from the high temperature and high pressure process streams may contain volatile impurities, such as acetic acid, formic acid, and furfural, i.e., impurities that are produced in the process. In this situation, the flashed "dirty vapor" can be passed through an indirect contact heat exchanger containing a clean fluid (i.e., a clean vapor exchanger), thereby generating a "clean vapor." The "clean vapor" does not contain the volatile impurities of the "dirty vapor," but still contains a substantial amount of recovered energy (in the form of heat and pressure). The clean fluid that becomes the clean vapor can be any suitable clean fluid that does not contain any components that may be undesirable to have in the process stream. Suitable clean fluids can comprise, consist of, or consist essentially of water, methanol, ethanol, propanol, butanol, pentanol, or combinations thereof. Clean vapor is desirable in industrial processes, because the clean vapor can be used to directly admix with or inject into process streams without adding undesirable impurities. Moreover, directly admixing/injecting a clean vapor into process streams is beneficial from the standpoint of providing latent heat that is transferred upon condensation. As used herein, indirectly generating a clean vapor using recovered energy (e.g., in the form of a flashed vapor) is not considered to involve a heat transfer fluid.

As used herein, a "slurry" means a mixture comprising solids in a liquid carrier. In some embodiments, a "slurry" may be a suspension of fine particulates (e.g., less than 1000 microns, less than about 750 microns, less than about 500 microns, less than about 400 microns, less than about 300 microns, less than about 200 microns, or less than about 100 microns) in a liquid carrier. In other embodiments, a slurry may be a mixture comprising larger particles (e.g., wood chips, about 0.25 inches to about 1 inch in diameter) in a liquid carrier. In some embodiments, a slurry is a suspension of fine particles in a liquid carrier, in which the slurry is a viscous paste having the consistency of, e.g., toothpaste, honey, molasses, etc., at ambient conditions. As used herein, a slurry that is a viscous paste is a slurry having a viscosity of about 500 cP or more, e.g., about 1,000 cP or more, 2,000 cP or more, about 3,000 cP or more, about 4,000 cP or more, about 5,000 cP or more, about 6,000 cP or more, about 7,000 cP or more, about 8,000 cP or more, about 9,000 cP or more, about 10,000 cP or more, about 15,000 cP or more, about 20,000 cP or more, about 25,000 cP or more, about 30,000 cP or more, about 50,000 cP or more, about 75,000 cP or more, or about 100,000 cP or more. Alternatively, or in addition, a slurry that is a viscous paste as defined herein has a viscosity of about 100,000 cP or less, e.g., about 75,000 cP or less, about 50,000 cP or less, about 30,000 cP or less, about 25,000 cP or less, about 20,000 cP or less, about 15,000 cP or less, about 10,000 cP or less, about 9,000 cP or less, about 8,000 cP or less, about 7,000 cP or less, about 6,000 cP or less, about 5,000 cP or less, about 4,000 cP or less, about 3,000 cP or less, about 2,000 cP or less, or about 1,000 cP or less. Thus, a viscous paste as defined herein may have a viscosity defined by any or the foregoing endpoints. For example, the viscosity can be about 1,000 cP to about 50,000 cP, about 500 cP to about 7,000 cP, or about 4,000 cP to about 25,000 cP.

As used herein, "continuous" means a process which is uninterrupted for its duration, or interrupted, paused or suspended only momentarily, relative to the duration of the process. A method is "continuous" when, for example, a slurry comprising a feedstock material is fed into an apparatus without interruption or without a substantial interruption, or when the method is not performed in a batch process.

The interaction of a reactive fluid and a material comprising polymers and/or oligomers typically produces reaction products, and these reaction products can be transformed into other products by any suitable method, such as enzymatically, catalytically, non-catalytically, biocatalytically, or by a combination thereof.

As used herein, "transformed enzymatically" or "enzymatic transformation" means that the transformation (e.g., reaction) is effected by one or more enzymes, or by proteins or polypeptides having enzymatic activity (i.e., activity similar to that of bona fide enzymes).

As used herein, "transformed catalytically" or "catalytic transformation" means that the transformation (e.g., reaction) is effected by a catalyst or other agent having catalytic activity (e.g., acid, base, metal, and the like).

As used herein, "transformed non-catalytically" or "non-catalytic transformation" means that the transformation (e.g., reaction) is effected by a reactant or reagent that is consumed in the reaction.

As used herein, "transformed biocatalytically" or "biocatalytic transformation" means that the transformation is effected by one or more organisms (e.g., bacteria, yeast, algae, and the like).

As used herein, the terms "soluble" or "insoluble" refer to the solubility of a component or material in a liquid at ambient conditions, unless otherwise specified or clearly contradicted by context.

While the present invention is capable of being embodied in various forms, the description below of several embodiments is made with the understanding that the present disclosure is to be considered as an exemplification of the invention, and is not intended to limit the invention to the specific embodiments illustrated. Headings or sections may be provided for convenience only and are not to be construed to limit the invention in any manner. Embodiments illustrated under any heading or section may be combined with embodiments illustrated under any other heading or section.

The invention provides a method comprising, consisting of, or consisting essentially of:

providing a composition at a first temperature and a first pressure, wherein the composition comprises:
   at least one material selected from the group consisting of
      a polymer, an oligomer, and combinations thereof; and
   a liquid;

optionally, preheating the composition in a first preheating stage to form a preheated composition, wherein the preheated composition is characterized by a second temperature and a second pressure;

heating the composition or the preheated composition with a reactive fluid in a first heating stage to form a heated composition, wherein the reactive fluid is characterized by a third temperature and a third pressure, and the heated composition is characterized by a fourth temperature and a fourth pressure;
    wherein the reactive fluid is produced by a process comprising:
        providing a fluid;
        optionally, preheating the fluid in a second preheating stage to produce a preheated fluid having a fifth temperature and a fifth pressure; and
        heating the fluid or the preheated fluid in a second heating stage to produce the reactive fluid; and
    cooling the heated composition in a cooling stage to form a cooled composition, wherein the cooled composition is characterized by a sixth temperature and a sixth pressure;
    wherein:
        the cooled composition comprises one or more reaction products derived from the material;
        the cooling stage comprises a first flash evaporation, thereby producing a first flashed vapor and a first flashed composition;
        the first flashed composition is the same as or different from the cooled composition; and
            at least a portion of the first flashed vapor is used to perform a first useful function.

The steps in the method can be performed in any suitable order, as would be apparent to those of ordinary skill in the art.

Heating the composition or the preheated composition with a reactive fluid typically takes place by way of direct contact. For example, the reactive fluid is directly contacted with the composition or the preheated composition, in which energy from the reactive fluid is transferred to the composition or the preheated composition. In some embodiments, an indirect contact heat exchanger may be employed, in which the reactive fluid is not brought into direct contact with the composition or preheated composition (e.g., through the use of a tube-in-tube indirect heat exchanger, as described elsewhere herein).

FIG. 1A depicts an embodiment of the invention. Dashed lines generally indicate the flow path of energy recovered in the process. A composition (101) is provided and optionally is preheated in a first preheating stage (102) to form a preheated composition (not shown). The composition (101) or preheated composition is heated with a reactive fluid (109) in a first heating stage (103) to form a heated composition (not shown). The heated composition is cooled in a cooling stage (104) to form a cooled composition (105), in which the cooling stage (104) comprises a first flash evaporation, thereby producing a first flashed vapor (110) and a first flashed composition (not shown). At least a portion of the first flashed vapor (110) is used to perform a first useful function (111). The reactive fluid (109) is produced by a process comprising providing a fluid (106), optionally preheating the fluid (106) in a second preheating stage (107) to form a preheated fluid (not shown), and then heating the fluid (106) or the preheated fluid in a second heating stage (108) to form the reactive fluid (109). In some embodiments, the cooled composition (105) may be the same as or different from the first flashed composition.

In some embodiments of the invention, in the cooling stage, the heated composition is contacted with a cool fluid having a temperature less than the fourth temperature (e.g., the heated composition is quenched with a cooler fluid) prior to the first flash evaporation. In some embodiments, in the cooling stage, after the first flash evaporation, the first flashed composition is contacted with a cool fluid having a temperature that is lower than a temperature of the first flashed composition (e.g., the first flashed composition is quenched with a cooler fluid). In some embodiments, the cooling stage may have any number of flash evaporations (e.g., one, two, three, four, five, six, seven, and so on). In some embodiments, in the cooling stage, the at least one flash evaporation can be combined, in any suitable order, with one or more indirect cooling steps with a heat transfer fluid (e.g., one, two three, four, five, six, seven, and so on). In some embodiments, the cooling stage comprises passive cooling. For example, the cooling stage may comprise any number and order of active cooling steps (e.g., flash evaporation, indirect cooling with a heat transfer fluid, and so on), and passive cooling may be performed at any point before or after the active cooling steps. As an example, a heated composition may be cooled via flash evaporation (to form a flashed vapor and a flashed composition), and then the flashed composition, still above ambient temperature, may be passively cooled (e.g., to ambient temperature), if desired. In some embodiments, the cooled composition is at ambient conditions. In other embodiments, the cooled composition is at an elevated temperature and/or pressure, as compared to ambient conditions. In yet other embodiments, the cooled composition is cooled below ambient conditions, if desired.

In some embodiments of the invention, at least one of the optional first and second preheating stages is performed. In other embodiments, the first preheating stage is performed and the second preheating stage is not performed. In yet other embodiments, the first preheating stage is not performed and the second preheating stage is performed. In some embodiments, both the first preheating stage and the second preheating stage are performed. In other embodiments, neither the first preheating stage nor the second preheating stage is performed.

In some embodiments of the invention, the first useful function is selected from the group consisting of indirectly preheating the composition, indirectly preheating the fluid, and combinations thereof. In some embodiments, the first useful function is selected from the group consisting of active heating, electricity generation, feeding to a co-located or nearby plant, evaporation, clean vapor generation, and combinations thereof.

The indirect preheating typically occurs by way of a tube-in-tube heat exchanger, in which the flashed vapor may be fed through an outer tube that surrounds an inner tube containing the composition. Alternate arrangements are contemplated, for example, in which the inner tube contains the first flashed vapor and the outer tube contains the composition. The flashed vapor and the composition may flow co-currently or counter-currently. Alternative apparatuses that are not tube-in-tube heat exchangers are also contemplated and may also be used for heat exchange.

In the course of the indirect preheating using flashed vapors, at least a portion of the flashed vapors may be condensed as heat is transferred from the relatively hotter flashed vapors to the relatively cooler composition, thereby forming a condensate derived from the flashed vapors. In some embodiments, at least a portion of the first flashed vapor is condensed to form a condensate, and at least a portion of the condensate can be used for a function selected from the group consisting of forming the composition used in the process of the invention, forming another composition that is different from the composition used in the process of the invention, directly cooling the heated composition prior to or during the cooling step (e.g., quenching the heated composition by direct contact of the condensate with the heated composition), directly cooling the first flashed composition, and combinations thereof. Reusing/recycling at least a portion of the condensate may be beneficial for conserving water and lowering the overall cost of the process.

At least a portion of any vapor used in an indirect preheating stage and exiting the indirect preheating stage may be used for a useful function as described herein. Any exiting vapor typically will have a lower total energy (e.g., lower temperature and/or lower pressure) than the original flashed vapor, as a consequence of heat transfer from the original flashed vapor in the preheating stage. This lower energy vapor may be desirable for a number of reasons, for example, less sophisticated and/or less expensive equipment may be needed to handle the lower energy vapor, and/or the lower energy vapor may have a proper temperature and/or pressure for reusing in other parts of the process (or a co-located or nearby process) where a higher temperature vapor would be detrimental to a process, processing equipment, and/or the material being processed. For example, certain equipment may fail or the material being processed may decompose if exposed to a vapor having too high of a temperature and/or pressure.

In some embodiments of the invention, the method is continuous, semi-continuous, batch, semi-batch, or combinations thereof.

In some embodiments of the invention, at least one of the optional first and second preheating stages is performed, and at least one of the first and second preheating stages does not employ energy recovered from the inventive process, and/or does not reuse energy recovered from a process occurring at a co-located or nearby plant. For example, at least one of the optional first and second preheating stages may instead employ electrical heating, combustion heating, induction heating, steam heating, saturated steam heating, and the like, and combinations thereof, as the source(s) for providing heat. In some embodiments, the optional first preheating stage is performed, and energy other than that recovered in the inventive method is used in the first preheating stage. In some embodiments, the optional second preheating stage is performed, and energy other than that recovered in the inventive method is used in the second preheating stage. In some embodiments, both the optional first and second preheating stages are performed, and energy other than that recovered in the inventive method is used in both the first and second preheating stages. In some embodiments, at least one of the first and second preheating does not use energy other than that recovered in the inventive method. In some embodiments, neither the first nor second preheating uses energy other than that recovered in the inventive method.

Figure 1B:
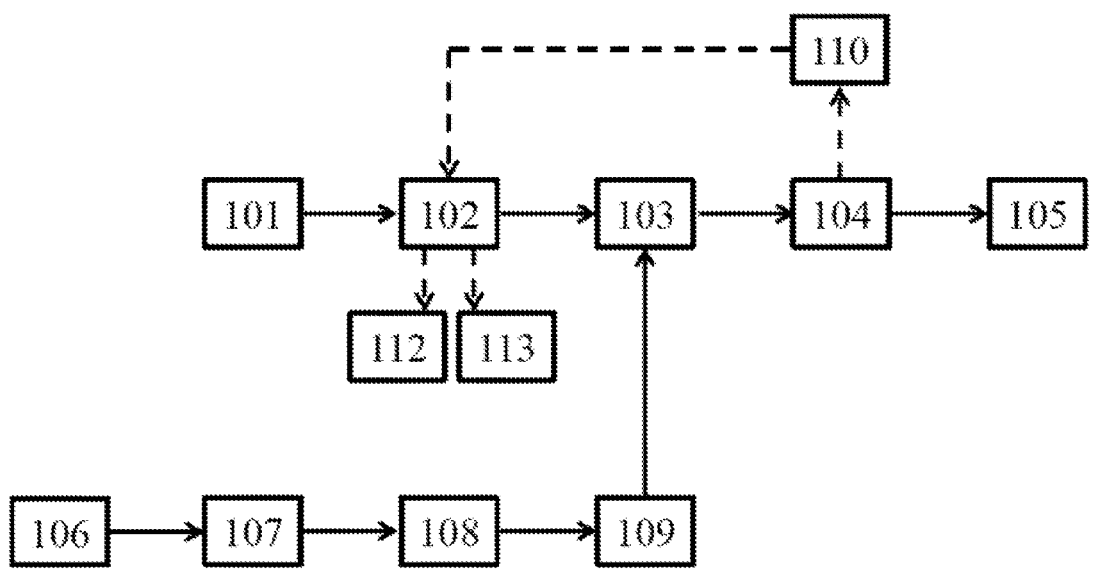
FIG. 1B illustrates an embodiment of a method of the invention, in which the first useful function is using at least a portion of the first flashed vapor to indirectly preheat the composition.
Figure 1C:
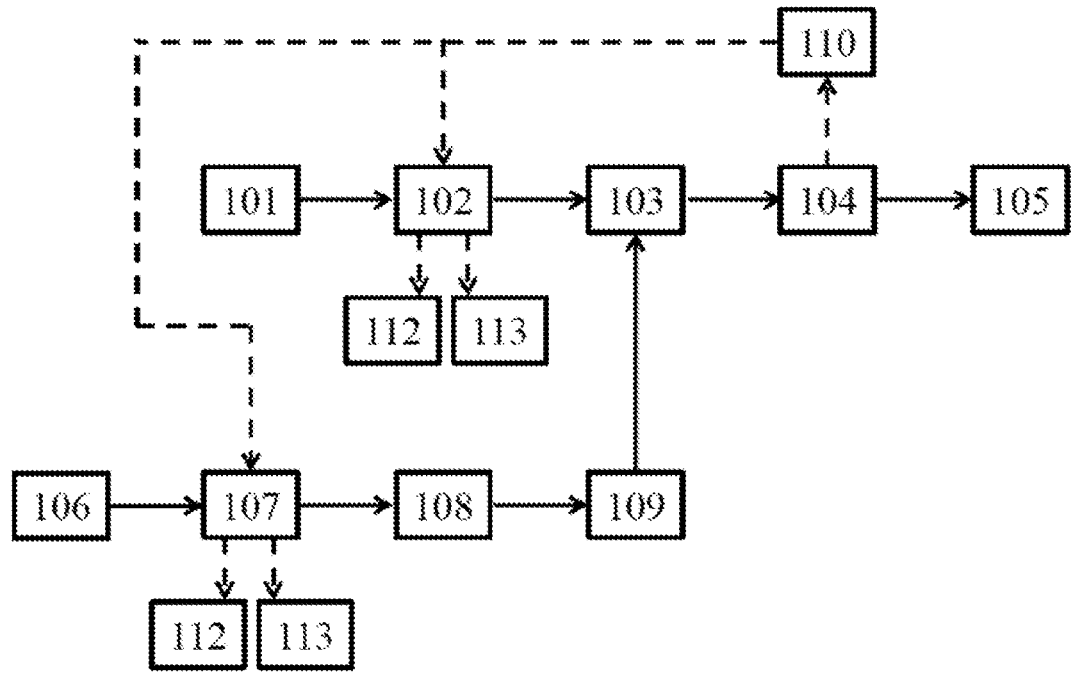
FIG. 1C illustrates an embodiment of a method of the invention, in which the first useful function is using at least a portion of the first flashed vapor to preheat both the composition and the fluid.
Figure 1D:
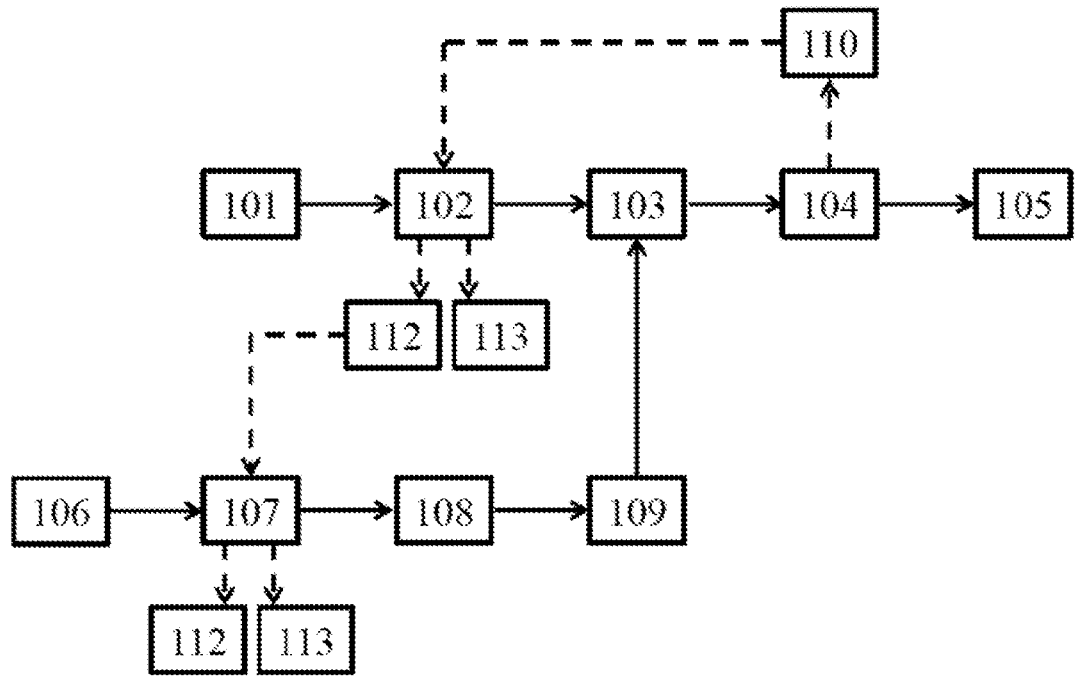
FIG. 1D illustrates an embodiment of a method of the invention, in which the first useful function is using at least a portion of the first flashed vapor to preheat the composition. At least a portion of the lower energy vapor issuing from the first preheating stage is used to preheat the fluid.

FIGS. 1B-1D depict some embodiments of the invention, in which at least one of the first and second preheating stages is performed, and in which the first useful function is selected from the group consisting of indirectly preheating the composition, indirectly preheating the fluid, and combinations thereof. Features 101-110 in FIGS. 1B-1D are the same as the features having the same numbers in FIG. 1A.

FIG. 1B depicts an embodiment of the invention, in which at least a first preheating stage (102) is performed, and the first useful function is indirectly preheating the composition (101) with at least a portion of the first flashed vapor (110) in the first preheating stage (102) to form a preheated composition (not shown). After at least a portion of the first flashed vapor (110) is used in the first preheating stage (102), lower energy vapor (112) and condensate (113) may exit the first preheating stage (102) and at least a portion of one or both of the lower energy vapor (112) and condensate (113) may be used for other useful functions, as described elsewhere herein.

FIG. 1C depicts an embodiment of the invention, in which both the first preheating stage (102) and the second preheating stage (107) are performed, and in which the first useful function is indirectly preheating the composition (101) and the fluid (106) with at least a portion of the first flashed vapor (110) in the first (102) and second (107) preheating stages, respectively.

FIG. 1D depicts an embodiment of the invention, in which both the first preheating stage (102) and the second preheating stage (107) are performed, and in which the first useful function is indirectly preheating the composition (101) with at least a portion of the first flashed vapor (110) in the first preheating stage (102). Lower energy vapor (112) and condensate (113) issue from first preheating stage (102), and at least a portion of the lower energy vapor (112) is used to indirectly preheat fluid (106) in the second preheating stage (107). Even lower energy vapor (112) and condensate (113) may similarly exit from the second preheating stage (107) and at least a portion of one or both of the lower energy vapor (112) and condensate (113) may be used for other functions, as described elsewhere herein. The vapor exiting from the second preheating stage (107) typically has an even lower amount of total energy than the vapor exiting from the first preheating stage (102), and thus the vapor exiting from the second preheating stage (107) may be suitably employed in processes and equipment amenable to this even lower energy vapor. Although FIG. 1D shows recovered energy flowing from the cooling stage (104) to the first preheating stage (102) to the second preheating stage (107), it is also contemplated that the recovered energy may instead flow from the cooling stage (104) to the second preheating stage (107) to the first preheating stage (102).

In some embodiments, the first useful function is indirectly generating a first clean vapor, and at least a portion of the first clean vapor is used to perform a second useful function. In some embodiments, the second useful function is not performed. In some embodiments, the second useful function is selected from the group consisting of directly or indirectly preheating the composition, directly or indirectly preheating the fluid, and combinations thereof. In some embodiments, the second useful function is selected from the group consisting of active heating, electricity generation, feeding to a co-located or nearby plant, evaporation, clean vapor generation, and combinations thereof (as described more fully elsewhere herein).

Direct preheating of the composition or fluid with clean vapor typically takes place by way of a direct contact heat exchanger. In a direct contact heat exchanger, the clean vapor is directly contacted with the composition or the preheated composition, in which energy from the clean vapor is transferred to the composition or the preheated composition. In some embodiments, the clean vapor may provide energy to preheat the composition and/or fluid by way of an indirect contact heat exchanger, in which the clean vapor is not brought into direct contact with the composition or preheated composition, but instead preheating is carried out through the use of a tube-in-tube indirect heat exchanger, or some other indirect means, as described elsewhere herein.

It is notable that the use of an indirect contact heat exchanger to cool a process stream with a heat transfer fluid typically results in fouling on the surface of the heat exchanger, which is expensive and time consuming to remove. Removal of the fouling typically is necessary to ensure optimal performance of the process or apparatus (e.g., optimum flow, pressure, etc.). In fact, if the fouling is not periodically removed, the system may fail. However, cooling a process stream by flash evaporation, and then using a clean vapor exchanger to indirectly generate clean vapors from the flashed vapors, does not result in any fouling (or at least results in significantly less fouling than the fouling that occurs when cooling a process stream in an indirect contact heat exchanger using a heat transfer fluid). Moreover, flash evaporation of a process stream also cools the process stream much faster than when cooling solely using an indirect contact heat exchanger with a heat transfer fluid. Therefore, the generation and use of clean vapors from the flashed vapors of a process stream has advantages over cooling a process stream with an indirect contact heat exchanger with a heat transfer fluid.

Figure 2A:
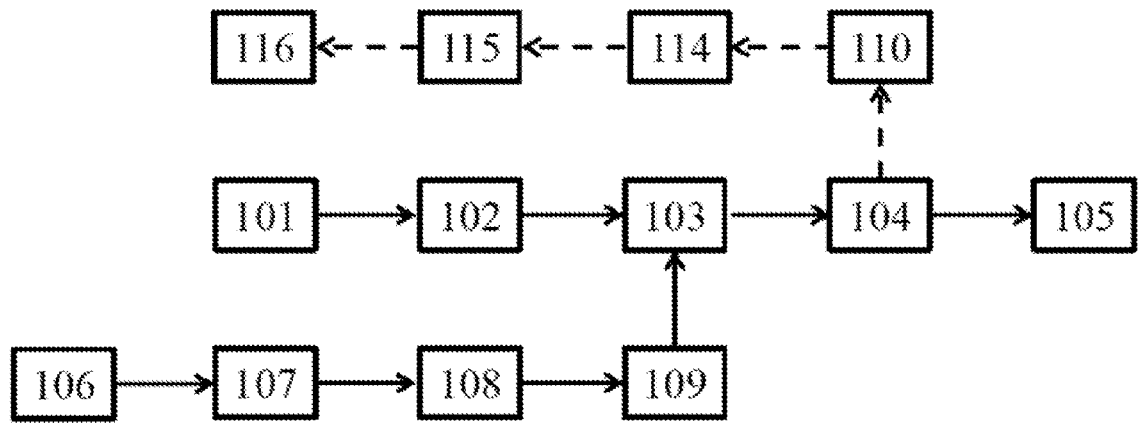
FIG. 2A illustrates an embodiment of a method of the invention, in which the first useful function is using at least a portion of the first flashed vapor to indirectly generate a clean vapor, and optionally at least a portion of the clean vapor is used to perform a second useful function.

FIG. 2A depicts an embodiment of the invention. Features 101-110 in FIG. 2A are the same as the features having the same numbers in FIG. 1A. Dashed lines generally indicate the flow path of energy recovered in the process. In FIG. 2A, the first useful function is indirectly generating a first clean vapor (115) in clean vapor exchanger (114) using at least a portion of the first flashed vapor (110), and at least a portion of the first clean vapor (115) is used to perform a second useful function (116).

Figure 2B:
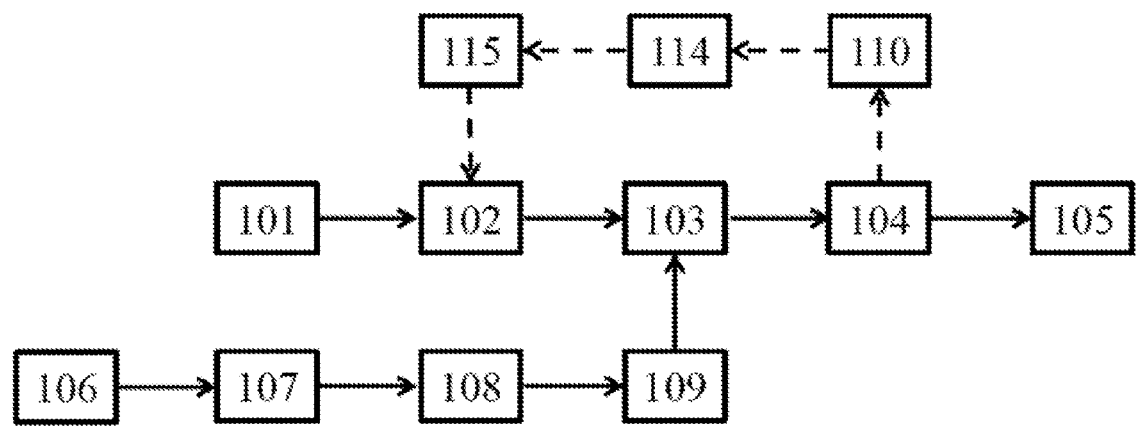
FIG. 2B illustrates an embodiment of a method of the invention, in which the first useful function is using at least a portion of the first flashed vapor to indirectly generate a clean vapor. The second useful function is using at least a portion of the clean vapor to directly or indirectly preheat the composition.
Figure 2C:
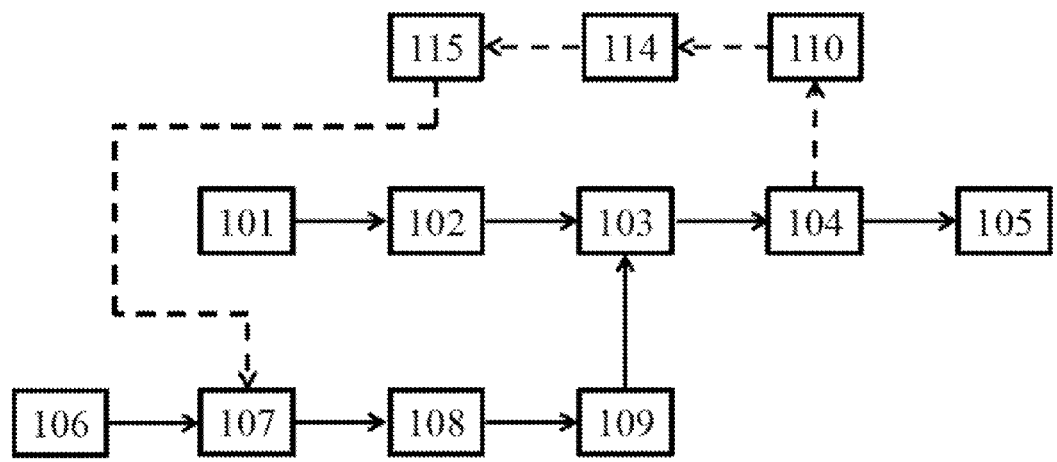
FIG. 2C illustrates an embodiment of a method of the invention, in which the first useful function is using at least a portion of the first flashed vapor to indirectly generate a clean vapor. The second useful function is using at least a portion of the clean vapor to directly or indirectly preheat the fluid.
Figure 2D:
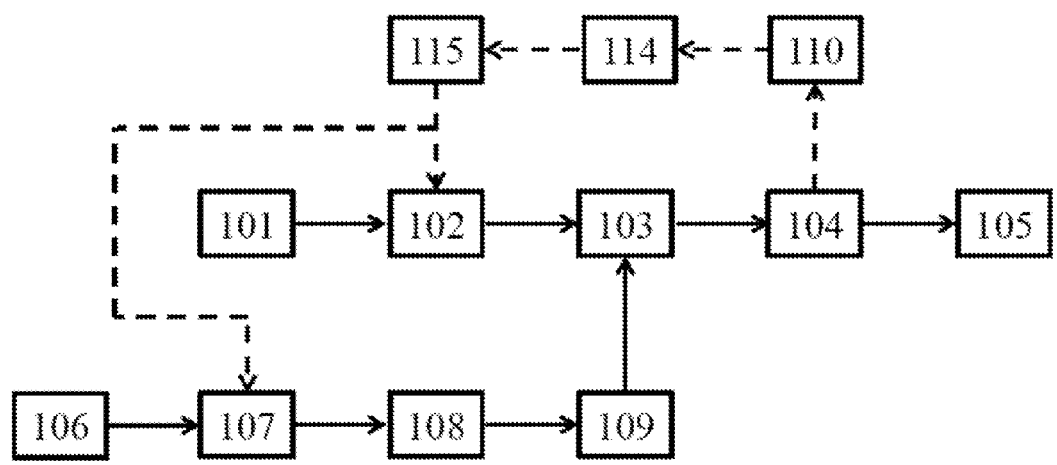
FIG. 2D illustrates an embodiment of a method of the invention, in which the first useful function is using at least a portion of the first flashed vapor to indirectly generate a clean vapor. The second useful function is using at least a portion of the clean vapor to directly or indirectly preheat the composition and the fluid.

FIGS. 2B-2D depict some embodiments of the invention, in which at least one of the first and second preheating stages is performed, and in which the second useful function is selected from the group consisting of directly or indirectly preheating the composition, directly or indirectly preheating the fluid, and combinations thereof. Features 101-110 in FIGS. 2B-2D are the same as the features having the same numbers in FIG. 1A. Dashed lines generally indicate the flow path of energy recovered in the process.

FIG. 2B depicts an embodiment of the invention, in which at least a first preheating stage (102) is performed, and the second useful function is directly or indirectly preheating the composition (101) with at least a portion of the clean vapor (115) in the first preheating stage (102) to form a preheated composition (not shown). In embodiments where the second useful function is indirect preheating of the composition (101) with at least a portion of the clean vapor (115) in the first preheating stage (102), lower energy vapor (not shown) and condensate (not shown) may exit the first preheating stage (102) and at least a portion of one or both of the lower energy vapor and condensate may be used for other functions, as described elsewhere herein. For example, the lower energy vapor exiting the first preheating stage (102) may be used in the second preheating stage (107) to preheat the fluid (106).

FIG. 2C depicts an embodiment of the invention, in which at least a second preheating stage (107) is performed, and the second useful function is directly or indirectly preheating the fluid (106) with at least a portion of the clean vapor (115) in the second preheating stage (107) to form a preheated fluid (not shown). In embodiments where the second useful function is indirect preheating of the fluid (106) with at least a portion of the clean vapor (115) in the second preheating stage (107), lower energy vapor (not shown) and condensate (not shown) may exit the second preheating stage (107) and at least a portion of one or both of the lower energy vapor and condensate may be used for other functions, as described elsewhere herein. For example, the lower energy vapor exiting the second preheating stage (107) may be used in the first preheating stage (102) to preheat the composition (101).

FIG. 2D depicts an embodiment of the invention, in which both the first preheating stage (102) and the second preheating stage (107) are performed, and in which the second useful function is directly or indirectly preheating the composition (101) and the fluid (106) with at least a portion of the clean vapor (115) in the first (102) and second (107) preheating stages, respectively. In embodiments where the second useful function is indirect preheating of the composition (101) or the fluid (106) with at least a portion of the clean vapor (115) in the first preheating stage (102) or the second preheating stage (107), lower energy vapor (not shown) and condensate (not shown) may exit the first (102) or second (107) preheating stages, and at least a portion of one or both of the lower energy vapor and condensate may be used for other functions, as described elsewhere herein.

In some embodiments of the invention, in the cooling stage, the first flash evaporation is preceded by or followed by indirect cooling using a heat transfer fluid, thereby producing an energized heat transfer fluid and a heat-exchanged composition. In other words, the composition that is at an elevated temperature is cooled by indirect cooling using a heat transfer fluid, and the composition that now has a lower temperature is considered the heat-exchanged composition. In some embodiments, the energized heat transfer fluid is used to perform a third useful function. In some embodiments, the third useful function is not performed. In some embodiments, the third useful function is the same as or different from the first and/or second useful functions. In some embodiments, a heat transfer fluid is not employed, e.g., the method does not employ indirect cooling using a heat transfer fluid.

The use of heat transfer fluids to cool process streams typically takes place by way of an indirect contact heat exchanger, in which the higher temperature process stream may be fed through an outer tube than surrounds an inner tube containing the heat transfer fluid. Alternate arrangements are contemplated, for example, in which the inner tube contains the higher temperature process stream and the outer tube contains the heat transfer fluid. The higher temperature process stream and the heat transfer fluid may flow co-currently or counter-currently.

Figure 3A:
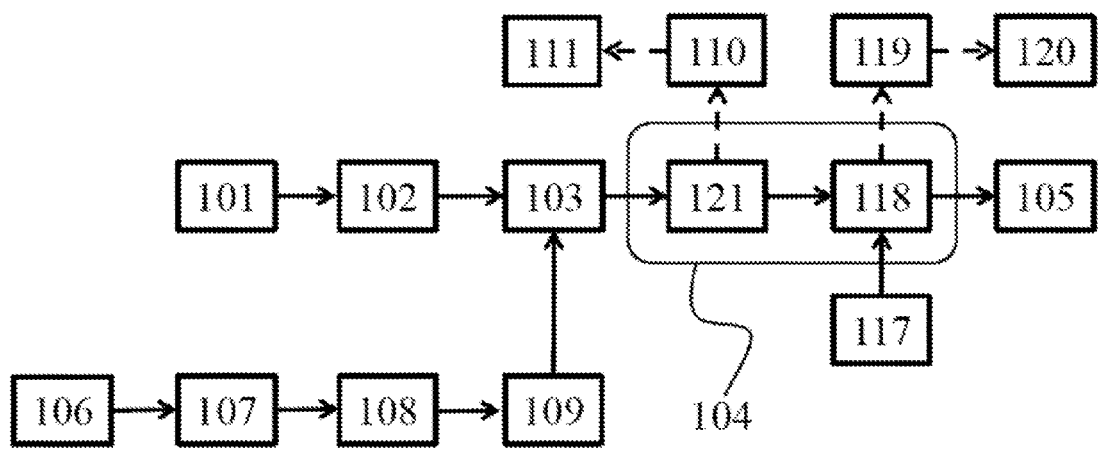
FIG. 3A illustrates an embodiment of a method of the invention, in which the cooling stage comprises a first flash evaporation followed by an indirect heat exchange using a heat transfer fluid. At least a portion of the first flashed vapor is used to perform a first useful function, and optionally at least a portion of the energized heat transfer fluid is used to perform a third useful function.
Figure 3B:
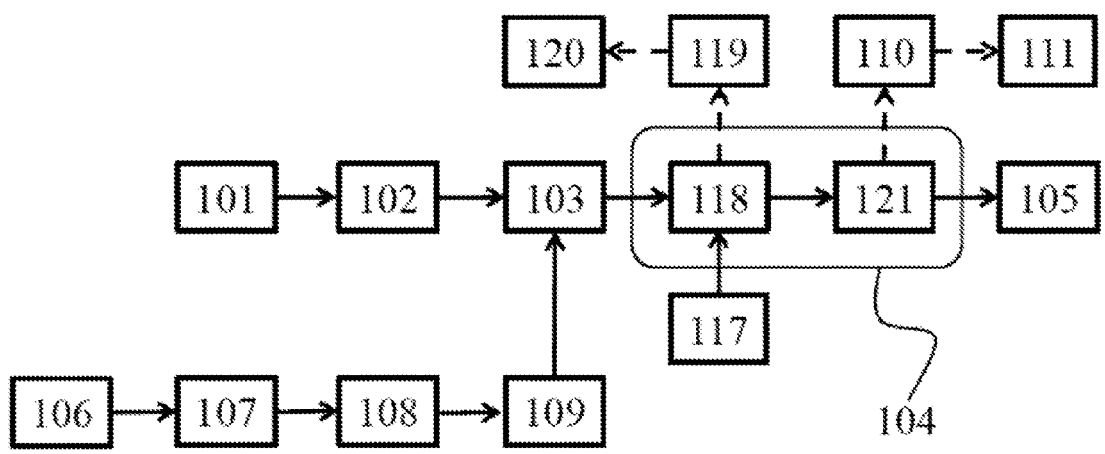
FIG. 3B illustrates an embodiment of a method of the invention, in which the cooling stage comprises a first flash evaporation preceded by an indirect heat exchange using a heat transfer fluid. At least a portion of the first flashed vapor is used to perform a first useful function, and optionally at least a portion of the energized heat transfer fluid is used to perform a third useful function.

FIGS. 3A and 3B depict two embodiments of the invention. Features 101-110 in FIGS. 3A and 3B are the same as the features having the same numbers in FIG. 1A. Dashed lines generally indicate the flow path of energy recovered in the process.

In FIG. 3A, the cooling stage (104) comprises both a first flash evaporation (121) and indirect cooling (118) with a heat transfer fluid. More particularly, in the cooling stage (104) the first flash evaporation (121) is followed by indirectly cooling (118) the first flashed composition with a heat transfer fluid (117), thereby producing a heat exchanged composition (not shown) and an energized heat transfer fluid (119). The first flashed vapor (110) is used to perform a first useful function (111). The energized heat transfer fluid (119) is used to perform a third useful function (120), if desired. The energized heat transfer fluid (119) has a lower energy than it otherwise would have, had the indirect cooling using the heat transfer fluid not been preceded by the first flash evaporation. This lower energy energized heat transfer fluid may be desirable for a number of applications, such as where a higher energy energized heat transfer fluid would be detrimental to the equipment or processed material, as described elsewhere herein.

In FIG. 3B, the cooling stage (104) comprises both indirect cooling (118) with a heat transfer fluid, as well as a first flash evaporation (121). Specifically, the first flash evaporation (121) is preceded by indirectly cooling (118) the first flashed composition with a heat transfer fluid (117), thereby producing a heat exchanged composition (not shown) and an energized heat transfer fluid (119). The energized heat transfer fluid (119) is used to perform a third useful function (120), if desired. The first flashed vapor (110) is used to perform a first useful function (111), and the first flashed vapor has a lower energy than it otherwise would have, had the first flash evaporation not been preceded by the indirect cooling using the heat transfer fluid. This lower energy first flashed vapor may be desirable for a number of applications, such as where a higher energy first flashed vapor would be detrimental to the equipment or processed material, as described elsewhere herein.

In some embodiments, at least one of the first and second preheating stages is performed, and the third useful function is selected from the group consisting of indirectly preheating the composition, indirectly preheating the fluid, and combinations thereof. In some embodiments, the third useful function is selected from the group consisting of active heating, electricity generation, feeding to a co-located or nearby plant, evaporation, clean vapor generation, and combinations thereof (as described more fully elsewhere herein). In some embodiments, the third useful function comprises indirectly preheating at least one of the composition and the fluid. In some embodiments, the third useful function comprises indirectly preheating both the composition and the fluid. In some embodiments, the heat transfer fluid is circulated in a continuous loop between the cooling stage and at least one of the first preheating stage and the second preheating stage. In some embodiments, the heat transfer fluid is circulated in a continuous loop between the cooling stage and both the first preheating stage and the second preheating stage, in any suitable order. As used herein, "circulating the heat transfer fluid in a continuous loop" means that the heat transfer fluid may first flow to the cooling stage where it obtains energy (e.g., acquires thermal energy from the heated composition), then the energized heat transfer fluid flows to at least one of the first and second preheating stages where it releases at least some of the obtained energy (e.g., thermal energy), and then the heat transfer fluid flows back to the cooling stage where the cycle is repeated. The heat transfer fluid need not (although may) cool to ambient temperature prior to restarting the cycle.

Figure 3C:
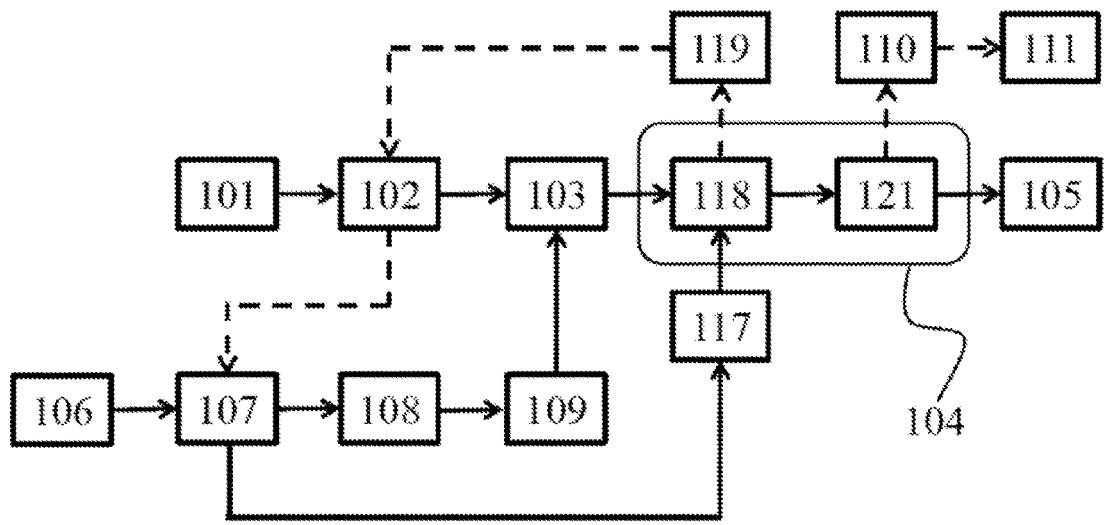
FIG. 3C illustrates an embodiment of a method of the invention, in which the cooling stage comprises a first flash evaporation preceded by an indirect heat exchange using a heat transfer fluid. At least a portion of the first flashed vapor is used to perform a first useful function. The energized heat transfer fluid is cycled in a continuous loop between the cooling stage, the first preheating stage, the second preheating stage, and back to the cooling stage.

FIG. 3C depicts an embodiment of the invention. Features 101-110 in FIG. 3C are the same as the features having the same numbers in FIG. 1A. Dashed lines generally indicate the flow path of energy recovered in the process. In FIG. 3C, the cooling stage (104) comprises both indirect cooling (118) with a heat transfer fluid, as well as a first flash evaporation (121). The first preheating stage (102) and the second preheating stage (107) are performed, and the third useful function is indirectly preheating the composition (101) and the fluid (106) in the first (102) and second (107) preheating stages, respectively. In this embodiment, the heat transfer fluid is circulated in a continuous loop from the indirect cooling (118) in the cooling stage (104), to the first preheating stage (102), to the second preheating stage (107), and then back to the indirect cooling (118) in the cooling stage (104) where the cycle repeats in a continuous loop. After indirect cooling (118) with the heat transfer fluid (117), the process stream is then subjected to a first flash evaporation (121), thereby producing a first flashed vapor (110) and a first flashed composition (not shown). The first flashed vapor (110) is used to perform a first useful function (111). The first flashed vapor (110) has a lower energy than it otherwise would have, had the first flash evaporation not been preceded by the indirect cooling using the heat transfer fluid. This lower energy first flashed vapor may be desirable for a number of applications, such as where a higher energy first flashed vapor would be detrimental to the equipment or processed material, as described elsewhere herein. Although FIG. 3C shows recovered energy flowing from the cooling stage (104) to the first preheating stage (102) to the second preheating stage (107), it is also contemplated that the recovered energy may instead flow from the cooling stage (104) to the second preheating stage (107) to the first preheating stage (102).

Cooling higher temperature process streams with lower temperature process streams (e.g., within the same process, or from related or compatible processes) can be beneficial from the standpoint of directly and efficiently cooling higher temperature process streams, without substantially diluting the process streams. Cooling in this manner prevents the need to evaporate additional liquid from a process stream that may have been added when directly cooling with a cooler liquid (typically a pure liquid not containing desirable solute or solids) that is not a process stream. For example, the cooler process stream may contain the same or similar compounds as in the higher temperature process stream, and thus directly cooling the higher temperature process stream with the cooler process stream would not result in much (or at least would not result in a substantial amount of) dilution. As used herein, a "substantial" amount of dilution includes a change (decrease) in concentration of at least about 1% (e.g., at least about 5%, at least about 10%, at least about 15%, at least about 20%, or at least about 25%). In some embodiments, the heat-exchanged composition can be used to cool the first flashed composition. For example, when the heat-exchanged composition has a lower temperature than the first flashed composition, the heat-exchanged composition can be used to cool the first flashed composition. FIG. 3A shows an embodiment of the invention, in which the heat-exchanged composition would have a lower temperature than the first flashed composition, as a consequence of the order in the cooling stage of the first flash evaporation and the indirect cooling with a heat transfer fluid. In other embodiments, the first flashed composition can be used to cool the heat-exchanged composition. For example, when the first flashed composition has a lower temperature than the heat-exchanged composition, the first flashed composition can be used to cool the heat-exchanged composition. FIGS. 3B and 3C show embodiments of the invention, in which the first flashed composition would have a lower temperature than the heat-exchanged composition, as a consequence of the order in the cooling stage of the first flash evaporation and the indirect cooling with a heat transfer fluid.

In some embodiments of the invention, in the cooling stage, the first flash evaporation is preceded by or followed by a second flash evaporation, thereby producing a second flashed vapor and a second flashed composition. In some embodiments, the second flashed vapor is used to perform a fourth useful function. In some embodiments, the fourth useful function is not performed. In some embodiments, the fourth useful function is the same as or different from the first, second, and/or third useful functions. In some embodiments, a second flash evaporation is not performed. In some embodiments, the second flashed composition is the same as or different from the cooled composition.

Figure 4A:
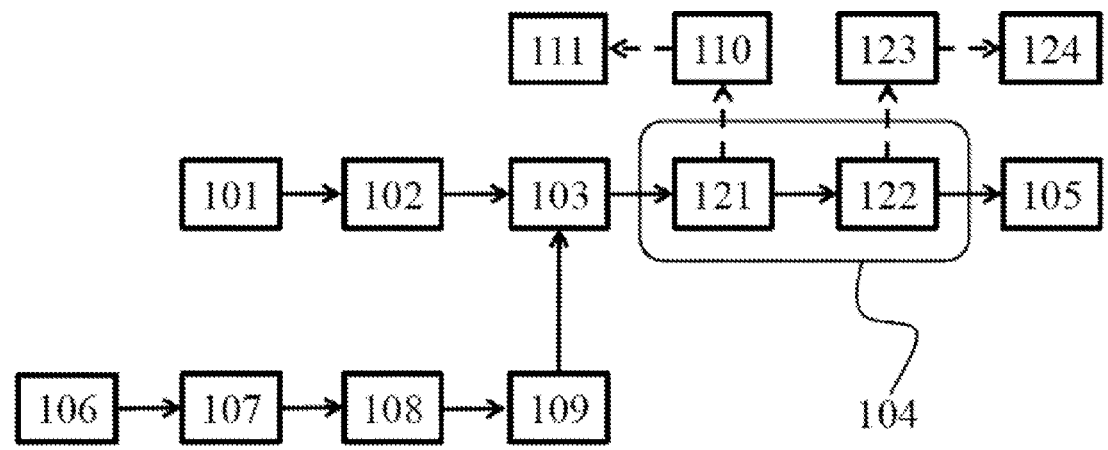
FIG. 4A illustrates an embodiment of a method of the invention, in which the cooling stage comprises a first flash evaporation followed by a second flash evaporation. The first flashed vapor is used to perform a first useful function, and optionally the second flashed vapor is used to perform a second useful function.
Figure 4B:
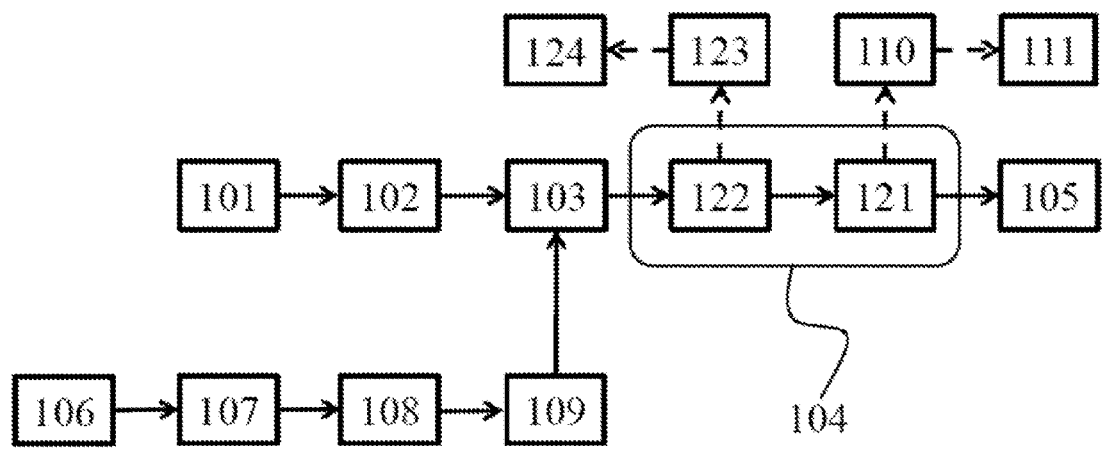
FIG. 4B illustrates an embodiment of a method of the invention, in which the cooling stage comprises a first flash evaporation preceded by a second flash evaporation. The first flashed vapor is used to perform a first useful function, and optionally the second flashed vapor is used to perform a second useful function.

FIGS. 4A and 4B depict two embodiments of the invention. Features 101-110 in FIGS. 4A and 4B are the same as the features having the same numbers in FIG. 1A. Dashed lines generally indicate the flow path of energy recovered in the process.

In FIG. 4A, the cooling stage (104) comprises both a first flash evaporation (121) and a second flash evaporation (122). More particularly, in the cooling stage (104) the first flash evaporation (121) is followed by a second flash evaporation (122), thereby producing a first flashed vapor (110) that is used to perform a first useful function (111), and a second flashed vapor (123) that is optionally used to perform a fourth useful function (124). The second flashed vapor (123) has a lower energy than it otherwise would have, had the second flash evaporation (122) not been preceded by the first flash evaporation (121). This lower energy second flashed vapor (123) may be desirable for a number of applications, such as where a higher energy flashed vapor would be detrimental to the equipment or material that is processed, as described elsewhere herein.

In FIG. 4B, the cooling stage (104) comprises both a first flash evaporation (121) and a second flash evaporation (122). More particularly, in the cooling stage (104) the first flash evaporation (121) is preceded by a second flash evaporation (122), thereby producing a first flashed vapor (110) that is used to perform a first useful function (111), and a second flashed vapor (123) that is optionally used to perform a fourth useful function (124). The first flashed vapor (110) has a lower energy than it otherwise would have, had the first flash evaporation (121) not been preceded by the second flash evaporation (122). This lower energy first flashed vapor (110) may be desirable for a number of applications, such as where a higher energy flashed vapor would be detrimental to the equipment or processed material, as described elsewhere herein.

In some embodiments, at least one of the first and second preheating stages is performed, and the fourth useful function is selected from the group consisting of indirectly preheating the composition, indirectly preheating the fluid, and combinations thereof. In some embodiments, the fourth useful function is selected from the group consisting of active heating, electricity generation, feeding to a co-located or nearby plant, evaporation, clean vapor generation, and combinations thereof (as described more fully elsewhere herein). In some embodiments, the fourth useful function is not performed. In some embodiments, the fourth useful function is indirectly generating a second clean vapor, and at least a portion of the second clean vapor is used to perform a fifth useful function. In some embodiments, the fifth useful function is the same as or different from the first, second, third, and/or fourth useful functions. In some embodiments, the fifth useful function is not performed. In some embodiments, at least one of the first and second preheating stages is performed, and the fifth useful function is selected from the group consisting of directly or indirectly preheating the composition, directly or indirectly preheating the fluid, and combinations thereof. In some embodiments, (i) at least one of the first and second preheating stages is performed, (ii) the first flash evaporation is followed by the second flash evaporation, and (iii) the first useful function is at least one of indirectly preheating the composition and indirectly preheating the fluid. In some embodiments, (i) the first flash evaporation is preceded by the second flash evaporation, (ii) the first useful function comprises indirectly generating a first clean vapor, and (iii) at least a portion of the first clean vapor is used to perform a second useful function (as described elsewhere herein). Many suitable arrangements of flash evaporations and recovered energy utilization are contemplated.

Figure 4C:
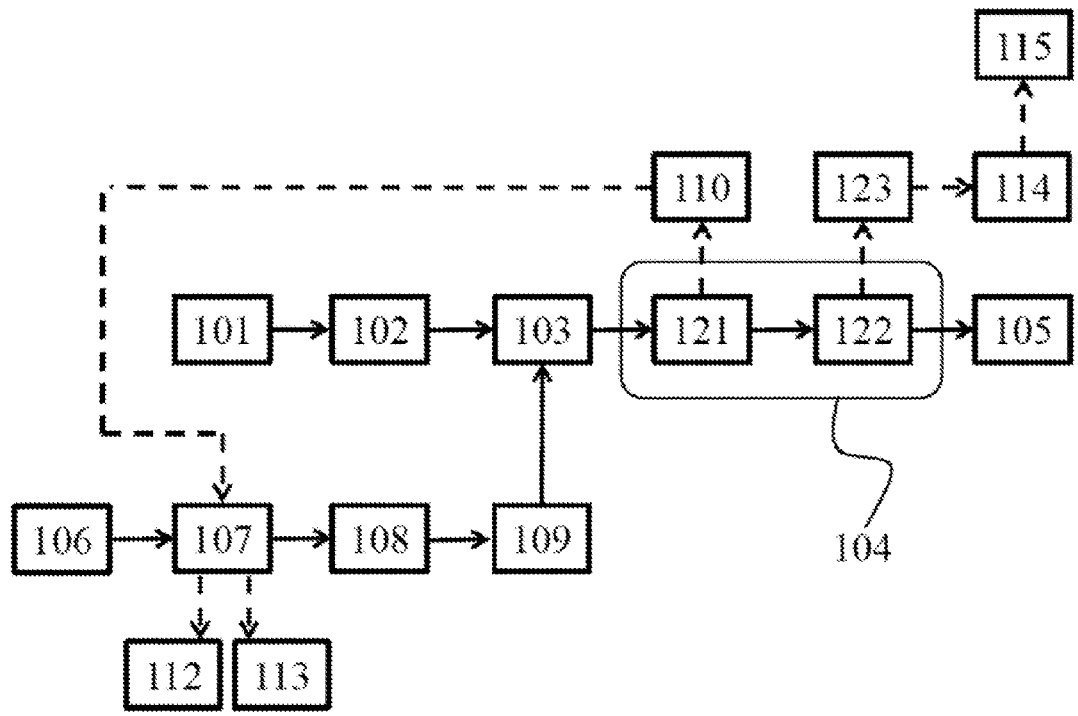
FIG. 4C illustrates an embodiment of a method of the invention, in which the cooling stage comprises a first flash evaporation followed by a second flash evaporation. The first useful function is using at least a portion of the first flashed vapor to preheat the fluid. The second useful function is using at least a portion of the second flashed vapor to indirect generate a second clean vapor, and the second clean vapor optionally is used to perform a fifth useful function.

FIG. 4C depicts an embodiment of the invention. Features 101-110 in FIG. 4C is the same as the features having the same numbers in FIG. 1A. Dashed lines generally indicate the flow path of energy recovered in the process.

In FIG. 4C, the cooling stage (104) comprises both a first flash evaporation (121) and a second flash evaporation (122). More particularly, in the cooling stage (104) the first flash evaporation (121) produces a first flashed vapor (110) and a first flashed composition (not shown). At least the second preheating stage (107) is performed, and at least a portion of the first flashed vapor (110) is used in the second preheating stage (107) to indirectly preheat the fluid (106). After at least a portion of the first flashed vapor (110) is used in the second preheating stage (107), lower energy vapor (112) and condensate (113) may exit the second preheating stage (107) and at least a portion of one or both of the lower energy vapor (112) and condensate (113) may be used for other useful functions, as described elsewhere herein. The second flash evaporation (122) produces a second flashed vapor (123) and a second flashed composition (not shown), and at least a portion of the second flashed vapor (123) is used to indirectly generate a first clean vapor (115) in clean vapor exchanger (114). Optionally, at least a portion of the first clean vapor (115) is used for a second useful function. The second flashed vapor (123) has a lower energy than it otherwise would have, had the second flash evaporation (122) not been preceded by the first flash evaporation (121) in the cooling stage (104). For this same reason, the first clean vapor (115) also has a lower energy.

In some embodiments of the invention, at least a portion of the second flashed vapor is condensed to form a condensate, and at least a portion of the condensate can be used for a function selected from the group consisting of forming the composition used in the process of the invention, forming another composition that is different from the composition used in the process of the invention, directly cooling the heated composition prior to or during the cooling step (e.g., quenching the heated composition by direct contact of the condensate with the heated composition), directly cooling the first or second flashed composition, and combinations thereof. Reusing/recycling at least a portion of the condensate may be beneficial for conserving water and lowering the overall cost of the process. In FIG. 4C, for example, when the second flashed vapor (123) generates the first clean vapor (115) in the clean vapor exchanger (114), at least a portion of the second flashed vapor (123) will condense to form a condensate (not shown) in clean vapor exchanger (114). At least one of lower energy vapor (not shown) and condensate (not shown) likely will issue from clean vapor exchanger (114) in this process.

In some embodiments of the invention, the second flashed composition can be used to cool the first flashed composition. For example, when the second flashed composition has a lower temperature than the first flashed composition, the second flashed composition can be used to cool the first flashed composition. FIGS. 4A and 4C show embodiments of the invention, in which the second flashed composition would have a lower temperature than the first flashed composition, as a consequence of the order in the cooling stage of the first flash evaporation and the second flash evaporation. In other embodiments, the first flashed composition can be used to cool the second flashed composition. For example, when the first flashed composition has a lower temperature than the second flashed composition, the first flashed composition can be used to cool the second flashed composition. FIG. 4B shows an embodiment of the invention, in which the first flashed composition would have a lower temperature than the second flashed composition, as a consequence of the order in the cooling stage of the first flash evaporation and the second flash evaporation. As described elsewhere herein, there are benefits to recycling cooler process streams to directly cool higher temperature process streams.

In some embodiments of the invention, at least one condition is satisfied, wherein the condition is selected from the group consisting of:

(a) the at least one material comprises, consists of, or consists essentially of biomass, cellulosic material, paper, cardboard, lignocellulosic material, municipal waste, municipal solid waste, manufacturing waste, food waste, agricultural residue, corn stover, sugarcane bagasse, grass, bark, dedicated energy crops, wood residue, sawmill and paper mill discards, hardwood, softwood, plastic, waste plastic, synthetic polymers or oligomers, natural polymers or oligomers, or combinations thereof;

(b) the composition comprises, consists of, or consists essentially of a first solid fraction and a first liquid fraction, wherein the first solid fraction comprises, consists of, or consists essentially of cellulose, insoluble lignin, and optionally insoluble $C_5$ oligosaccharides, and the first liquid fraction comprises, consists of, or consists essentially of at least one first soluble component selected from the group consisting of $C_5$ monosaccharides, $C_5$ oligosaccharides, xylose, arabinose, lyxose, ribose, soluble lignin, and combinations thereof;

(c) the cooled composition comprises, consists of, or consists essentially of a second solid fraction and a second liquid fraction, wherein the second solid fraction comprises, consists of, or consists essentially of insoluble lignin, and the second liquid fraction comprises, consists of, or consists essentially of at least one second soluble component selected from the group consisting of $C_6$ monosaccharides, $C_6$ oligosaccharides, glucose, galactose, mannose, fructose, soluble lignin, and combinations thereof;

(d) no more than about 10 wt. % of the reaction products, based on the total weight of the reaction products, is dihydrogen, methane, carbon dioxide, carbon monoxide, tar, or combinations thereof; and (e) the reaction products comprise, consist of, or consist essentially of $C_6$ monosaccharides, $C_5$ monosaccharides, $C_6$ oligosaccharides having a degree of polymerization of 2 to 15, $C_5$ oligosaccharides having a degree of polymerization of 2 to 15, depolymerization products of a plastic, or combinations thereof.

In some embodiments of the invention, the material present in the composition can be any suitable material that comprises, consists of, or consists essentially of a polymer, an oligomer, or a combination thereof. Suitable materials that may be employed are selected from the group consisting of biomass, cellulosic material, paper, cardboard, lignocellulosic material, municipal waste, municipal solid waste, manufacturing waste, food waste, agricultural residue, corn stover, sugarcane bagasse, grass, bark, dedicated energy crops, wood residue, sawmill and paper mill discards, hardwood, softwood, plastic, waste plastic, synthetic polymers or oligomers, natural polymers or oligomers, and combinations thereof. The polymer can be any polymer, such as a homopolymer, a co-polymer, a block co-polymer, a triblock co-polymer, a random copolymer, or combinations thereof.

In some embodiments of the invention, the composition can comprise a first solid fraction and a first liquid fraction. In some embodiments, the first solid fraction can comprise cellulose, insoluble lignin, and optionally insoluble $C_5$ oligosaccharides. In some embodiments, the first liquid fraction may comprise at least one first soluble component selected from the group consisting of $C_5$ monosaccharides, $C_5$ oligosaccharides, xylose, arabinose, lyxose, ribose, soluble lignin, and combinations thereof. In some embodiments, the at least one material present in the composition can be part of the first solid fraction, part of the first liquid fraction, or a combination thereof.

In some embodiments of the invention, the cooled composition can comprise a second solid fraction and a second liquid fraction. In some embodiments, the second solid fraction can comprise insoluble lignin. In some embodiments, the second liquid fraction can comprise at least one second soluble component selected from the group consisting of $C_6$ monosaccharides, $C_6$ oligosaccharides, glucose, galactose, mannose, fructose, soluble lignin, and combinations thereof.

In some embodiments of the invention, no more than about 10 wt. % of the reaction products (e.g., no more than about 9 wt. %, no more than about 8 wt. %, no more than about 7 wt. %, no more than about 6 wt. %, no more than about 5 wt. %, no more than about 4 wt. %, no more than about 3 wt. %, no more than about 2 wt. %, or no more than about 1 wt. % of the reaction products), based on the total weight of the reaction products, is dihydrogen, methane, carbon dioxide, carbon monoxide, tar, or combinations thereof. The amount of reaction products can refer to the reaction products individually, or in combination (e.g., in some embodiments the reaction products may contain no more than about 4 wt. % of dihydrogen, or the reaction products may contain no more than 4 wt. % of dihydrogen and carbon dioxide, for example). As used herein, "tar" is a mixture of hydrocarbons and free carbon. Dihydrogen, methane, carbon dioxide, carbon monoxide, and tar typically are reaction products of biomass gasification processes or biomass pyrolysis processes, or both. In some embodiments, the method is not a gasification process (e.g., a biomass gasification process) or a pyrolysis process (e.g., biomass pyrolysis process), both of which are well known in the art.

In some embodiments of the invention, the reaction products are selected from the group consisting of $C_6$ monosaccharides, $C_5$ monosaccharides, $C_6$ oligosaccharides having a degree of polymerization of 2 to 15, $C_5$ oligosaccharides having a degree of polymerization of 2 to 15, depolymerization products of a plastic, and combinations thereof. $C_6$ monosaccharides include, for example, glucose, galactose, mannose, fructose, or combinations thereof. $C_6$ oligosaccharides include, for example, oligomers of glucose, galactose, mannose, fructose, or combinations thereof, having a degree of polymerization of 2 to 15. $C_5$ monosaccharides include, for example, xylose, arabinose, lyxose, ribose, or combinations thereof. $C_5$ oligosaccharides include, for example, oligomers of xylose, arabinose, lyxose, ribose, or combinations thereof, having a degree of polymerization of 2 to 15.

In some embodiments of the invention, the composition can be a slurry, a mixture, a suspension, a dispersion, a solution, a sludge, a syrup, a paste, or a combination thereof.

In some embodiments of the invention, the composition comprises a liquid, and the liquid comprises, consists of, or consists essentially of water, methanol, ethanol, propanol, butanol, pentanol, carbon dioxide, sulfur dioxide, or combinations thereof. In a preferred embodiment, the liquid comprises water. In some embodiments, the liquid does not comprise, consist of, or consist essentially of an organic solvent (e.g., an exogenous organic solvent).

In some embodiments of the invention, the solids content of the composition, based on the total weight of the composition, is about 1 wt. % or more, e.g., about 5 wt. % or more, about 10 wt. % or more, about 11 wt. % or more, about 12 wt. % or more, about 13 wt. % or more, about 14 wt. % or more, about 15 wt. % or more, about 16 wt. % or more, about 17 wt. % or more, about 18 wt. % or more, about 19 wt. % or more, about 20 wt. % or more, about 21 wt. % or more, about 22 wt. % or more, about 23 wt. % or more, about 24 wt. % or more, about 25 wt. % or more, about 26 wt. % or more, about 27 wt. % or more, about 28 wt. % or more, about 29 wt. % or more, about 30 wt. % or more, about 32 wt. % or more, or about 34 wt. % or more. Alternatively, or in addition, the solids content of the composition, based on the total weight of the composition, is about 35 wt. % or less, e.g., about 34 wt. % or less, about 32 wt. % or less, about 30 wt. % or less, about 29 wt. % or less, about 28 wt. % or less, about 27 wt. % or less, about 26 wt. % or less, about 25 wt. % or less, about 24 wt. % or less, about 23 wt. % or less, about 22 wt. % or less, about 21 wt. % or less, about 20 wt. % or less, about 19 wt. % or less, about 18 wt. % or less, about 17 wt. % or less, about 16 wt. % or less, about 15 wt. % or less, about 14 wt. % or less, about 13 wt. % or less, about 12 wt. % or less, about 11 wt. % or less, about 10 wt. % or less, about 5 wt. % or less. Thus, the solids content of the composition can be bounded by any two of the foregoing endpoints. For example, the solids content of the composition can be about 15 wt. % to about 29 wt. %, about 10 wt. % to about 18 wt. %, or about 24 wt. % to about 27 wt. %.

In some embodiments of the invention, the method is carried out substantially free of exogenous acid. In some embodiments of the invention, an exogenous acid is not employed. In other embodiments, an exogenous acid is employed. In some embodiments, the exogenous acid comprises, consists of, or consists essentially of an organic acid, an inorganic acid, or combinations thereof. In some embodiments, the exogenous acid comprises, consists of, or consists essentially of sulfuric acid, sulfonic acid, phosphoric acid, phosphonic acid, nitric acid, nitrous acid, hydrochloric acid, hydrofluoric acid, hydrobromic acid, hydroiodic acid, aliphatic carboxylic acids (such as acetic acid and formic acid), aromatic carboxylic acids (such as benzoic acid and salicylic acid), dicarboxylic acids (such as oxalic acid, phthalic acid, sebacic acid, and adipic acid), aliphatic fatty acids (such as oleic acid, palmitic acid, and stearic acid), aromatic fatty acids (such as phenylstearic acid), amino acids, carbonic acid (e.g., formed in situ by the addition of carbon dioxide), sulfurous acid (e.g., formed in situ by the addition of sulfur dioxide), or combinations thereof.

In some embodiments of the invention, at least one of the reactions products are transformed into a substance selected from the group consisting of gasoline, jet fuel, butanol, acetic acid, acetic anhydride, acetone, acrylic acid, adipic acid, benzene, ethanol, ethylene, ethylene glycol, ethylene oxide, methanol, polypropylene, terephthalic acid, toluene, xylene, 1,3-propanediol, 1,4-butanediol, acetoin, alanine, arabitol, ascorbic acid, aspartic acid, citric acid, coumaric acid, fumaric acid, glycerol, glycine, kojic acid, lactic acid, lysine, malonic acid, proline, propionic acid, serine, sorbitol, succinic acid, threonine, xylitol, sugar acids, glucaric acid, gluconic acid, xylonic acids, acontic acid, glutamic acid, malic acid, oxalic acid, formic acid, acetaldehyde, 3-hydroxypropionic acid, 2,5-furan dicarboxylic acid, furfural, glutaric acid, itaconic acid, levulinic acid, and combinations thereof. In some embodiments, the transformation occurs enzymatically, catalytically, non-catalytically, biocatalytically, or by a combination thereof.

In some embodiments of the invention, at least one condition is satisfied, wherein the condition is selected from the group consisting of:

(a) the first temperature is about 1° C. to about 100° C., and/or the first pressure is about 14 psia to about 50 psia;

(b) the second temperature is about 100° C. to about 250° C., and/or the second pressure is about 14 psia to about 575 psia (c) the third temperature is about 250° C. to about 600° C., and/or the third pressure is about 575 psia to about 5500 psia;

(d) the fourth temperature is about 250° C. to about 550° C., and/or the fourth pressure is about 575 psia to about 5500 psia;

(e) the fifth temperature is about 100° C. to about 300° C., and/or the fifth pressure is about 14 psia to about 5500 psia; and (f) the sixth temperature is about 1° C. to about 500° C., the sixth pressure is about 14 psia to less than about 5500 psia, the sixth temperature is lower than the fourth temperature, and/or the fifth temperature and the fifth pressure are the same as or different from the first temperature and the first pressure, respectively.

The first temperature can be any suitable temperature. For example, the first temperature can be about 1° C. or more, e.g., about 5° C. or more, about 10° C. or more, about 15° C. or more, about 20° C. or more, about 25° C. or more, about 30° C. or more, about 35° C. or more, about 40° C. or more, about 45° C. or more, about 50° C. or more, about 55° C. or more, about 60° C. or more, about 65° C. or more, about 70° C. or more, about 75° C. or more, about 80° C. or more, about 85° C. or more, about 90° C. or more, or about 95° C. or more. Alternatively, or in addition, the first temperature can be about 100° C. or less, e.g., about 95° C. or less, about 90° C. or less, about 85° C. or less, about 80° C. or less, about 75° C. or less, about 70° C. or less, about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, about 10° C. or less, or about 5° C. or less. Thus, the first temperature can be bounded by any two of the foregoing endpoints. For example, the first temperature can be about 35° C. to about 75° C., about 65° C. to about 95° C., or about 20° C. to about 30° C.

The first pressure can be any suitable pressure. For example, the first pressure can be about 14 psia or more, e.g., about 14.7 psia or more, about 15 psia or more, about 20 psia or more, about 25 psia or more, about 30 psia or more, about 35 psia or more, about 40 psia or more, or about 45 psia or more. Alternatively, or in addition, the first pressure can be about 50 psia or less, e.g., about 45 psia or less, about 40 psia or less, about 35 psia or less, about 30 psia or less, about 25 psia or less, about 20 psia or less, about 15 psia or less, or about 14.7 psia or less. Thus, the first pressure can be bounded by any two of the foregoing endpoints. For example, the first pressure can be about 14.7 psia to about 15 psia, about 25 psia to about 45 psia, or about 14 psia to about 30 psia.

The second temperature can be any suitable temperature. For example, the second temperature can be about 100° C. or more, e.g., about 110° C. or more, about 120° C. or more, about 130° C. or more, about 140° C. or more, about 150° C. or more, about 160° C. or more, about 170° C. or more, about 180° C. or more, about 190° C. or more, about 200° C. or more, about 210° C. or more, about 220° C. or more, about 230° C. or more, or about 240° C. or more. Alternatively, or in addition, the second temperature can be about 250° C. or less, e.g., about 240° C. or less, about 230° C. or less, about 220° C. or less, about 210° C. or less, about 200° C. or less, about 190° C. or less, about 180° C. or less, about 170° C. or less, about 160° C. or less, about 150° C. or less, about 140° C. or less, about 130° C. or less, about 120° C. or less, or about 110° C. or less. Thus, the second temperature can be bounded by any two of the foregoing endpoints. For example, the second temperature can be about 130° C. to about 230° C., about 110° C. to about 140° C., or about 220° C. to about 240° C.

The second pressure can be any suitable pressure. For example, the second pressure can be about 14 psia or more, e.g., about 14.7 psia or more, about 15 psia or more, about 25 psia or more, about 50 psia or more, about 75 psia or more, about 100 psia or more, about 125 psia or more, about 150 psia or more, about 175 psia or more, about 200 psia or more, about 225 psia or more, about 250 psia or more, about 275 psia or more, about 300 psia or more, about 325 psia or more, about 350 psia or more, about 375 psia or more, about 400 psia or more, about 425 psia or more, about 450 psia or more, about 475 psia or more, about 500 psia or more, about 525 psia or more, or about 550 psia or more. Alternatively, or in addition, the second pressure can be about 575 psia or less, e.g., about 550 psia or less, about 525 psia or less, about 500 psia or less, about 475 psia or less, about 450 psia or less, about 425 psia or less, about 400 psia or less, about 375 psia or less, about 350 psia or less, about 325 psia or less, about 300 psia or less, about 275 psia or less, about 250 psia or less, about 225 psia or less, about 200 psia or less, about 175 psia or less, about 150 psia or less, about 125 psia or less, about 100 psia or less, about 75 psia or less, about 50 psia or less, about 25 psia or less, about 15 psia or less, or about 14.7 psia or less. Thus, the second pressure can be bound by any two of the foregoing endpoints. For example, the second pressure can be about 50 psia to about 275 psia, about 125 psia to about 500 psia, or about 400 psia to about 450 psia.

The third temperature can be any suitable temperature. For example, the third temperature can be about 250° C. or more, e.g., about 275° C. or more, about 300° C. or more, about 325° C. or more, about 350° C. or more, about 375° C. or more, about 400° C. or more, about 425° C. or more, about 450° C. or more, about 475° C. or more, about 500° C. or more, about 525° C. or more, about 550° C. or more, or about 575° C. or more. Alternatively, or in addition, the third temperature can be about 600° C. or less, e.g., about 575° C. or less, about 550° C. or less, about 525° C. or less, about 500° C. or less, about 475° C. or less, about 450° C. or less, about 425° C. or less, about 400° C. or less, about 375° C. or less, about 350° C. or less, about 325° C. or less, about 300° C. or less, or about 275° C. or less. Thus, the third temperature can be bound by any two of the foregoing endpoints. For example, the third temperature can be about 375° C. to about 500° C., about 325° C. to about 425° C., or about 525° C. to about 600° C.

The third pressure can be any suitable third pressure. For example, the third pressure can be about 575 psia or more, e.g., about 600 psia or more, about 700 psia or more, about 800 psia or more, about 900 psia or more, about 1000 psia or more, about 1100 psia or more, about 1200 psia or more, about 1300 psia or more, about 1400 psia or more, about 1500 psia or more, about 1600 psia or more, about 1700 psia or more, about 1800 psia or more, about 1900 psia or more, about 2000 psia or more, about 2100 psia or more, about 2200 psia or more, about 2300 psia or more, about 2400 psia or more, about 2500 psia or more, about 2600 psia or more, about 2700 psia or more, about 2800 psia or more, about 2900 psia or more, about 3000 psia or more, about 3100 psia or more, about 3200 psia or more, about 3300 psia or more, about 3400 psia or more, about 3500 psia or more, about 3600 psia or more, about 3700 psia or more, about 3800 psia or more, about 3900 psia or more, about 4000 psia or more, about 4100 psia or more, about 4200 psia or more, about 4300 psia or more, about 4400 psia or more, about 4500 psia or more, about 4600 psia or more, about 4700 psia or more, about 4800 psia or more, about 4900 psia or more, about 5000 psia or more, about 5100 psia or more, about 5200 psia or more, about 5300 psia or more, or about 5400 psia or more. Alternatively, or in addition, the third pressure can be about 5500 psia or less, e.g., about 5400 psia or less, about 5300 psia or less, about 5200 psia or less, about 5100 psia or less, about 5000 psia or less, about 4900 psia or less, about 4800 psia or less, about 4700 psia or less, about 4600 psia or less, about 4500 psia or less, about 4400 psia or less, about 4300 psia or less, about 4200 psia or less, about 4100 psia or less, about 4000 psia or less, about 3900 psia or less, about 3800 psia or less, about 3700 psia or less, about 3600 psia or less, about 3500 psia or less, about 3400 psia or less, about 3300 psia or less, about 3200 psia or less, about 3100 psia or less, about 3000 psia or less, about 2900 psia or less, about 2800 psia or less, about 2700 psia or less, about 2600 psia or less, about 2500 psia or less, about 2400 psia or less, about 2300 psia or less, about 2200 psia or less, about 2100 psia or less, about 2000 psia or less, about 1900 psia or less, about 1800 psia or less, about 1700 psia or less, about 1600 psia or less, about 1500 psia or less, about 1400 psia or less, about 1300 psia or less, about 1200 psia or less, about 1100 psia or less, about 1000 psia or less, about 900 psia or less, about 800 psia or less, about 700 psia or less, or about 600 psia or less. Thus, the third pressure can be bounded by any two of the foregoing endpoints. For example, the third pressure can be about 1200 psia to about 3800 psia, about 2000 psia to about 2800 psia, or about 3700 psia to about 5400 psia.

The fourth temperature can be any suitable temperature. For example, the fourth temperature can be about 250° C. or more, e.g., about 275° C. or more, about 300° C. or more, about 325° C. or more, about 350° C. or more, about 375° C. or more, about 400° C. or more, about 425° C. or more, about 450° C. or more, about 475° C. or more, about 500° C. or more, or about 525° C. or more. Alternatively, or in addition, the fourth temperature can be about 550° C. or less, e.g., about 525° C. or less, about 500° C. or less, about 475° C. or less, about 450° C. or less, about 425° C. or less, about 400° C. or less, about 375° C. or less, about 350° C. or less, about 325° C. or less, about 300° C. or less, or about 275° C. or less. Thus, the fourth temperature can be bounded by any two of the foregoing endpoints. For example, the fourth temperature can be about 425° C. to about 550° C., about 325° C. to about 375° C., or about 350° C. to about 500° C.

The fourth pressure can be any suitable pressure. For example, the fourth pressure can be about 575 psia or more, e.g., about 600 psia or more, about 700 psia or more, about 800 psia or more, about 900 psia or more, about 1000 psia or more, about 1100 psia or more, about 1200 psia or more, about 1300 psia or more, about 1400 psia or more, about 1500 psia or more, about 1600 psia or more, about 1700 psia or more, about 1800 psia or more, about 1900 psia or more, about 2000 psia or more, about 2100 psia or more, about 2200 psia or more, about 2300 psia or more, about 2400 psia or more, about 2500 psia or more, about 2600 psia or more, about 2700 psia or more, about 2800 psia or more, about 2900 psia or more, about 3000 psia or more, about 3100 psia or more, about 3200 psia or more, about 3300 psia or more, about 3400 psia or more, about 3500 psia or more, about 3600 psia or more, about 3700 psia or more, about 3800 psia or more, about 3900 psia or more, about 4000 psia or more, about 4100 psia or more, about 4200 psia or more, about 4300 psia or more, about 4400 psia or more, about 4500 psia or more, about 4600 psia or more, about 4700 psia or more, about 4800 psia or more, about 4900 psia or more, about 5000 psia or more, about 5100 psia or more, about 5200 psia or more, about 5300 psia or more, or about 5400 psia or more. Alternatively, or in addition, the fourth pressure can be about 5500 psia or less, e.g., about 5400 psia or less, about 5300 psia or less, about 5200 psia or less, about 5100 psia or less, about 5000 psia or less, about 4900 psia or less, about 4800 psia or less, about 4700 psia or less, about 4600 psia or less, about 4500 psia or less, about 4400 psia or less, about 4300 psia or less, about 4200 psia or less, about 4100 psia or less, about 4000 psia or less, about 3900 psia or less, about 3800 psia or less, about 3700 psia or less, about 3600 psia or less, about 3500 psia or less, about 3400 psia or less, about 3300 psia or less, about 3200 psia or less, about 3100 psia or less, about 3000 psia or less, about 2900 psia or less, about 2800 psia or less, about 2700 psia or less, about 2600 psia or less, about 2500 psia or less, about 2400 psia or less, about 2300 psia or less, about 2200 psia or less, about 2100 psia or less, about 2000 psia or less, about 1900 psia or less, about 1800 psia or less, about 1700 psia or less, about 1600 psia or less, about 1500 psia or less, about 1400 psia or less, about 1300 psia or less, about 1200 psia or less, about 1100 psia or less, about 1000 psia or less, about 900 psia or less, about 800 psia or less, about 700 psia or less, or about 600 psia or less. Thus, the fourth pressure can be bounded by any two of the foregoing endpoints. For example, the fourth pressure can be about 675 psia to about 1000 psia, about 3000 psia to about 3400 psia, or about 2800 psia to about 3300 psia.

The fifth temperature can be any suitable temperature. For example, the fifth temperature can be about 100° C. or more, e.g., about 110° C. or more, about 120° C. or more, about 130° C. or more, about 140° C. or more, about 150° C. or more, about 160° C. or more, about 170° C. or more, about 180° C. or more, about 190° C. or more, about 200° C. or more, about 210° C. or more, about 220° C. or more, about 230° C. or more, about 240° C. or more, about 250° C. or more, about 260° C. or more, about 270° C. or more, about 280° C. or more, or about 290° C. or more. Alternatively, or in addition, the fifth temperature can be about 300° C. or less, e.g., about 290° C. or less, about 280° C. or less, about 270° C. or less, about 260° C. or less, about 250° C. or less, about 240° C. or less, about 230° C. or less, about 220° C. or less, about 210° C. or less, about 200° C. or less, about 190° C. or less, about 180° C. or less, about 170° C. or less, about 160° C. or less, about 150° C. or less, about 140° C. or less, about 130° C. or less, about 120° C. or less, or about 110° C. or less. Thus, the fifth temperature can be bounded by any two of the foregoing endpoints. For example, the fifth temperature can be about 120° C. to about 180° C., about 140° C. to about 290° C., or about 200° C. to about 250° C.

The fifth pressure can be any suitable pressure. For example, the fifth pressure can be about 14 psia or more, e.g., 14.7 psia or more, about 15 psia or more, about 25 psia or more, about 50 psia or more, about 75 psia or more, about 100 psia or more, about 125 psia or more, about 150 psia or more, about 175 psia or more, about 200 psia or more, about 225 psia or more, about 250 psia or more, about 275 psia or more, about 300 psia or more, about 325 psia or more, about 350 psia or more, about 375 psia or more, about 400 psia or more, about 425 psia or more, about 450 psia or more, about 475 psia or more, about 500 psia or more, about 525 psia or more, about 550 psia or more, about 575 psia or more, about 600 psia or more, about 700 psia or more, about 800 psia or more, about 900 psia or more, about 1000 psia or more, about 1100 psia or more, about 1200 psia or more, about 1300 psia or more, about 1400 psia or more, about 1500 psia or more, about 1600 psia or more, about 1700 psia or more, about 1800 psia or more, about 1900 psia or more, about 2000 psia or more, about 2100 psia or more, about 2200 psia or more, about 2300 psia or more, about 2400 psia or more, about 2500 psia or more, about 2600 psia or more, about 2700 psia or more, about 2800 psia or more, about 2900 psia or more, about 3000 psia or more, about 3100 psia or more, about 3200 psia or more, about 3300 psia or more, about 3400 psia or more, about 3500 psia or more, about 3600 psia or more, about 3700 psia or more, about 3800 psia or more, about 3900 psia or more, about 4000 psia or more, about 4100 psia or more, about 4200 psia or more, about 4300 psia or more, about 4400 psia or more, about 4500 psia or more, about 4600 psia or more, about 4700 psia or more, about 4800 psia or more, about 4900 psia or more, about 5000 psia or more, about 5100 psia or more, about 5200 psia or more, about 5300 psia or more, or about 5400 psia or more. Alternatively, or in addition, the fifth pressure can be about 5500 psia or less, e.g., about 5400 psia or less, about 5300 psia or less, about 5200 psia or less, about 5100 psia or less, about 5000 psia or less, about 4900 psia or less, about 4800 psia or less, about 4700 psia or less, about 4600 psia or less, about 4500 psia or less, about 4400 psia or less, about 4300 psia or less, about 4200 psia or less, about 4100 psia or less, about 4000 psia or less, about 3900 psia or less, about 3800 psia or less, about 3700 psia or less, about 3600 psia or less, about 3500 psia or less, about 3400 psia or less, about 3300 psia or less, about 3200 psia or less, about 3100 psia or less, about 3000 psia or less, about 2900 psia or less, about 2800 psia or less, about 2700 psia or less, about 2600 psia or less, about 2500 psia or less, about 2400 psia or less, about 2300 psia or less, about 2200 psia or less, about 2100 psia or less, about 2000 psia or less, about 1900 psia or less, about 1800 psia or less, about 1700 psia or less, about 1600 psia or less, about 1500 psia or less, about 1400 psia or less, about 1300 psia or less, about 1200 psia or less, about 1100 psia or less, about 1000 psia or less, about 900 psia or less, about 800 psia or less, about 700 psia or less, about 600 psia or less, about 575 psia or less, about 550 psia or less, about 525 psia or less, about 500 psia or less, about 475 psia or less, about 450 psia or less, about 425 psia or less, about 400 psia or less, about 375 psia or less, about 350 psia or less, about 325 psia or less, about 300 psia or less, about 275 psia or less, about 250 psia or less, about 225 psia or less, about 200 psia or less, about 175 psia or less, about 150 psia or less, about 125 psia or less, about 100 psia or less, about 75 psia or less, about 50 psia or less, about 25 psia or less, about 15 psia or less, or about 14.7 psia or less. Thus, the fifth pressure can be bounded by any two of the foregoing endpoints. For example, the fifth pressure can be about 300 psia to about 4500 psia, about 2400 psia to about 3200 psia, or about 1300 psia to about 2800 psia.

The sixth temperature can be any suitable temperature. For example, the sixth temperature can be about 1° C. or more, e.g., about 5° C. or more, about 10° C. or more, about 25° C. or more, about 50° C. or more, about 75° C. or more, about 100° C. or more, about 125° C. or more, about 150° C. or more, about 175° C. or more, about 200° C. or more, about 225° C. or more, about 250° C. or more, about 275° C. or more, about 300° C. or more, about 325° C. or more, about 350° C. or more, about 375° C. or more, about 400° C. or more, about 425° C. or more, about 450° C. or more, or about 475° C. or more. Alternatively, or in addition, the sixth temperature can be about 500° C. or less, e.g., about 475° C. or less, about 450° C. or less, about 425° C. or less, about 400° C. or less, about 375° C. or less, about 350° C. or less, about 325° C. or less, about 300° C. or less, about 275° C. or less, about 250° C. or less, about 225° C. or less, about 200° C. or less, about 175° C. or less, about 150° C. or less, about 125° C. or less, about 100° C. or less, about 75° C. or less, about 50° C. or less, about 25° C. or less, about 10° C. or less, or about 5° C. or less. Thus, the sixth temperature can be bounded by any two of the foregoing endpoints. For example, the sixth temperature can be about 275° C. to about 425° C., about 10° C. to about 150° C., or about 200° C. to about 300° C.

The sixth pressure can be any suitable pressure. For example, the sixth pressure can be about 14 psia or more, e.g., 14.7 psia or more, about 15 psia or more, about 25 psia or more, about 50 psia or more, about 75 psia or more, about 100 psia or more, about 125 psia or more, about 150 psia or more, about 175 psia or more, about 200 psia or more, about 225 psia or more, about 250 psia or more, about 275 psia or more, about 300 psia or more, about 325 psia or more, about 350 psia or more, about 375 psia or more, about 400 psia or more, about 425 psia or more, about 450 psia or more, about 475 psia or more, about 500 psia or more, about 525 psia or more, about 550 psia or more, about 575 psia or more, about 600 psia or more, about 700 psia or more, about 800 psia or more, about 900 psia or more, about 1000 psia or more, about 1100 psia or more, about 1200 psia or more, about 1300 psia or more, about 1400 psia or more, about 1500 psia or more, about 1600 psia or more, about 1700 psia or more, about 1800 psia or more, about 1900 psia or more, about 2000 psia or more, about 2100 psia or more, about 2200 psia or more, about 2300 psia or more, about 2400 psia or more, about 2500 psia or more, about 2600 psia or more, about 2700 psia or more, about 2800 psia or more, about 2900 psia or more, about 3000 psia or more, about 3100 psia or more, about 3200 psia or more, about 3300 psia or more, about 3400 psia or more, about 3500 psia or more, about 3600 psia or more, about 3700 psia or more, about 3800 psia or more, about 3900 psia or more, about 4000 psia or more, about 4100 psia or more, about 4200 psia or more, about 4300 psia or more, about 4400 psia or more, about 4500 psia or more, about 4600 psia or more, about 4700 psia or more, about 4800 psia or more, about 4900 psia or more, about 5000 psia or more, about 5100 psia or more, about 5200 psia or more, about 5300 psia or more, or about 5400 psia or more. Alternatively, or in addition, the sixth pressure can be less than about 5500 psia, e.g., about 5400 psia or less, about 5300 psia or less, about 5200 psia or less, about 5100 psia or less, about 5000 psia or less, about 4900 psia or less, about 4800 psia or less, about 4700 psia or less, about 4600 psia or less, about 4500 psia or less, about 4400 psia or less, about 4300 psia or less, about 4200 psia or less, about 4100 psia or less, about 4000 psia or less, about 3900 psia or less, about 3800 psia or less, about 3700 psia or less, about 3600 psia or less, about 3500 psia or less, about 3400 psia or less, about 3300 psia or less, about 3200 psia or less, about 3100 psia or less, about 3000 psia or less, about 2900 psia or less, about 2800 psia or less, about 2700 psia or less, about 2600 psia or less, about 2500 psia or less, about 2400 psia or less, about 2300 psia or less, about 2200 psia or less, about 2100 psia or less, about 2000 psia or less, about 1900 psia or less, about 1800 psia or less, about 1700 psia or less, about 1600 psia or less, about 1500 psia or less, about 1400 psia or less, about 1300 psia or less, about 1200 psia or less, about 1100 psia or less, about 1000 psia or less, about 900 psia or less, about 800 psia or less, about 700 psia or less, about 600 psia or less, about 575 psia or less, about 550 psia or less, about 525 psia or less, about 500 psia or less, about 475 psia or less, about 450 psia or less, about 425 psia or less, about 400 psia or less, about 375 psia or less, about 350 psia or less, about 325 psia or less, about 300 psia or less, about 275 psia or less, about 250 psia or less, about 225 psia or less, about 200 psia or less, about 175 psia or less, about 150 psia or less, about 125 psia or less, about 100 psia or less, about 75 psia or less, about 50 psia or less, about 25 psia or less, about 15 psia or less, or about 14.7 psia or less. Thus, the sixth pressure can be bounded by any two of the foregoing endpoints. For example, the sixth pressure can be about 3000 psia to about 3700 psia, about 300 psia to about 700 psia, or about 1500 psia to about 3200 psia.

The first flashed composition has a seventh temperature and a seventh pressure, and the seventh temperature and seventh pressure can be any suitable temperature and pressure. For example, the seventh temperature can be about 1° C. or more, e.g., about 5° C. or more, about 10° C. or more, about 25° C. or more, about 50° C. or more, about 75° C. or more, about 100° C. or more, about 125° C. or more, about 150° C. or more, about 175° C. or more, about 200° C. or more, about 225° C. or more, about 250° C. or more, about 275° C. or more, about 300° C. or more, about 325° C. or more, about 350° C. or more, about 375° C. or more, about 400° C. or more, about 425° C. or more, about 450° C. or more, about 475° C. or more, about 500° C. or more, about 525° C. or more, or about 535° C. or more. Alternatively, or in addition, the seventh temperature can be about 545° C. or less, e.g., about 535° C. or less, about 525° C. or less, about 500° C. or less, about 475° C. or less, about 450° C. or less, about 425° C. or less, about 400° C. or less, about 375° C. or less, about 350° C. or less, about 325° C. or less, about 300° C. or less, about 275° C. or less, about 250° C. or less, about 225° C. or less, about 200° C. or less, about 175° C. or less, about 150° C. or less, about 125° C. or less, about 100° C. or less, about 75° C. or less, about 50° C. or less, about 25° C. or less, about 10° C. or less, or about 5° C. or less. Thus, the seventh temperature can be bounded by any two of the foregoing endpoints. For example, the seventh temperature can be about 75° C. to about 450° C., about 25° C. to about 125° C., or about 350° C. to about 545° C. The seventh temperature typically is lower than the fourth temperature.

The first flashed composition can have any suitable pressure (seventh pressure). For example, the seventh pressure can be about 14 psia or more, e.g., about 14.7 psia or more, about 15 psia or more, about 25 psia or more, about 50 psia or more, about 75 psia or more, about 100 psia or more, about 125 psia or more, about 150 psia or more, about 175 psia or more, about 200 psia or more, about 225 psia or more, about 250 psia or more, about 275 psia or more, about 300 psia or more, about 325 psia or more, about 350 psia or more, about 375 psia or more, about 400 psia or more, about 425 psia or more, about 450 psia or more, about 475 psia or more, about 500 psia or more, about 525 psia or more, or about 550 psia or more. Alternatively, or in addition, the seventh pressure can be about 575 psia or less, e.g., about 550 psia or less, about 525 psia or less, about 500 psia or less, about 475 psia or less, about 450 psia or less, about 425 psia or less, about 400 psia or less, about 375 psia or less, about 350 psia or less, about 325 psia or less, about 300 psia or less, about 275 psia or less, about 250 psia or less, about 225 psia or less, about 200 psia or less, about 175 psia or less, about 150 psia or less, about 125 psia or less, about 100 psia or less, about 75 psia or less, about 50 psia or less, about 25 psia or less, about 15 psia or less, or about 14.7 psia or less. Thus, the seventh pressure can be bound by any two of the foregoing endpoints. For example, the seventh pressure can be about 50 psia to about 275 psia, about 125 psia to about 500 psia, or about 400 psia to about 450 psia.

The first flashed vapor has a ninth temperature and a ninth pressure, and the ninth temperature and ninth pressure can be any suitable temperature and pressure. For example, the ninth temperature can be about 1° C. or more, e.g., about 5° C. or more, about 10° C. or more, about 25° C. or more, about 50° C. or more, about 75° C. or more, about 100° C. or more, about 125° C. or more, about 150° C. or more, about 175° C. or more, about 200° C. or more, about 225° C. or more, about 250° C. or more, about 275° C. or more, about 300° C. or more, about 325° C. or more, about 350° C. or more, about 375° C. or more, about 400° C. or more, about 425° C. or more, about 450° C. or more, about 475° C. or more, about 500° C. or more, about 525° C. or more, about 535° C. or more, or about 545° C. or more. Alternatively, or in addition, the ninth temperature can be about 550° C. or less, e.g., about 545° C. or less, about 535° C. or less, about 525° C. or less, about 500° C. or less, about 475° C. or less, about 450° C. or less, about 425° C. or less, about 400° C. or less, about 375° C. or less, about 350° C. or less, about 325° C. or less, about 300° C. or less, about 275° C. or less, about 250° C. or less, about 225° C. or less, about 200° C. or less, about 175° C. or less, about 150° C. or less, about 125° C. or less, about 100° C. or less, about 75° C. or less, about 50° C. or less, about 25° C. or less, about 10° C. or less, or about 5° C. or less. Thus, the ninth temperature can be bounded by any two of the foregoing endpoints. For example, the ninth temperature can be about 375° C. to about 425° C., about 125° C. to about 250° C., or about 350° C. to about 400° C. The ninth temperature typically is lower than the fourth temperature.

The first flashed vapor can have any suitable pressure (ninth pressure). For example, the ninth pressure can be about 14 psia or more, e.g., 14.7 psia or more, about 15 psia or more, about 25 psia or more, about 50 psia or more, about 75 psia or more, about 100 psia or more, about 125 psia or more, about 150 psia or more, about 175 psia or more, about 200 psia or more, about 225 psia or more, about 250 psia or more, about 275 psia or more, about 300 psia or more, about 325 psia or more, about 350 psia or more, about 375 psia or more, about 400 psia or more, about 425 psia or more, about 450 psia or more, about 475 psia or more, about 500 psia or more, about 525 psia or more, about 550 psia or more, about 575 psia or more, about 600 psia or more, about 700 psia or more, about 800 psia or more, about 900 psia or more, about 1000 psia or more, about 1100 psia or more, about 1200 psia or more, about 1300 psia or more, about 1400 psia or more, about 1500 psia or more, about 1600 psia or more, about 1700 psia or more, about 1800 psia or more, about 1900 psia or more, about 2000 psia or more, about 2100 psia or more, about 2200 psia or more, about 2300 psia or more, about 2400 psia or more, about 2500 psia or more, about 2600 psia or more, about 2700 psia or more, about 2800 psia or more, about 2900 psia or more, about 3000 psia or more, about 3100 psia or more, about 3200 psia or more, about 3300 psia or more, about 3400 psia or more, about 3500 psia or more, about 3600 psia or more, about 3700 psia or more, about 3800 psia or more, about 3900 psia or more, about 4000 psia or more, about 4100 psia or more, about 4200 psia or more, about 4300 psia or more, about 4400 psia or more, about 4500 psia or more, about 4600 psia or more, about 4700 psia or more, about 4800 psia or more, about 4900 psia or more, about 5000 psia or more, about 5100 psia or more, about 5200 psia or more, about 5300 psia or more, or about 5400 psia or more. Alternatively, or in addition, the ninth pressure can be less than about 5500 psia, e.g., about 5400 psia or less, about 5300 psia or less, about 5200 psia or less, about 5100 psia or less, about 5000 psia or less, about 4900 psia or less, about 4800 psia or less, about 4700 psia or less, about 4600 psia or less, about 4500 psia or less, about 4400 psia or less, about 4300 psia or less, about 4200 psia or less, about 4100 psia or less, about 4000 psia or less, about 3900 psia or less, about 3800 psia or less, about 3700 psia or less, about 3600 psia or less, about 3500 psia or less, about 3400 psia or less, about 3300 psia or less, about 3200 psia or less, about 3100 psia or less, about 3000 psia or less, about 2900 psia or less, about 2800 psia or less, about 2700 psia or less, about 2600 psia or less, about 2500 psia or less, about 2400 psia or less, about 2300 psia or less, about 2200 psia or less, about 2100 psia or less, about 2000 psia or less, about 1900 psia or less, about 1800 psia or less, about 1700 psia or less, about 1600 psia or less, about 1500 psia or less, about 1400 psia or less, about 1300 psia or less, about 1200 psia or less, about 1100 psia or less, about 1000 psia or less, about 900 psia or less, about 800 psia or less, about 700 psia or less, about 600 psia or less, about 575 psia or less, about 550 psia or less, about 525 psia or less, about 500 psia or less, about 475 psia or less, about 450 psia or less, about 425 psia or less, about 400 psia or less, about 375 psia or less, about 350 psia or less, about 325 psia or less, about 300 psia or less, about 275 psia or less, about 250 psia or less, about 225 psia or less, about 200 psia or less, about 175 psia or less, about 150 psia or less, about 125 psia or less, about 100 psia or less, about 75 psia or less, about 50 psia or less, about 25 psia or less, about 15 psia or less, or about 14.7 psia or less. Thus, the ninth pressure can be bounded by any two of the foregoing endpoints. For example, the ninth pressure can be about 3000 psia to about 3700 psia, about 300 psia to about 700 psia, or about 1500 psia to about 3200 psia.

Other flashed evaporations may be employed, e.g., a third, fourth, fifth, sixth, etc. flashed evaporations, having third, fourth, fifth, sixth, etc. flashed compositions and flashed vapors, respectively, associated therewith. The temperatures and pressures for a second flashed composition and second flashed vapor, third flashed composition and third flashed vapor, fourth flashed composition and fourth flashed vapor, etc., can be the same as the temperatures and pressure disclosed herein for the first flashed composition and first flashed vapor. For example, the temperatures for the third, fourth, fifth, etc., flashed compositions can be about 1° C. to about 545° C., or can be within any of the temperature ranges disclosed for the first flashed composition. Moreover, the pressures for the third, fourth, fifth, etc., flashed compositions can be about 14 psia to about 575 psia, or can be within any of the pressure ranges disclosed for the first flashed composition. Additionally, the temperatures for the third, fourth, fifth, etc., flashed vapors can be about 100° C. to about 545° C., or can be within any of the temperature ranges disclosed for the first flashed vapor. Furthermore, the pressures for the third, fourth, fifth, etc., flashed vapors can be about 14 psia to about 570 psia, or can be within any of the pressure ranges disclosed for the first flashed vapor. The second flashed composition has an eighth temperature and pressure associated therewith, and the second flashed vapor has a tenth temperature and pressure associated therewith. Similar numbering schemes may be employed to differentiate the temperature and pressure of the third, fourth, fifth, sixth, etc., flashed compositions and flashed vapors. Typically, when multiple flash evaporations are employed in the inventive method, the actual temperatures and pressures of each flashed composition and vapor likely would be different, but the temperatures and pressures disclosed herein for the first flashed composition are applicable to these other flashed compositions.

The numbered temperatures and/or pressures (e.g., "first temperature," "fifth temperature," etc.) can have any suitable relationship to any other numbered temperature and/or pressure. For example, the relationship can be the same, the different, higher than, or lower than. In some embodiments, the second temperature is higher than the first temperature. In some embodiments, the second pressure is higher than the first pressure. In some embodiments, the fourth temperature is higher than the second temperature. In some embodiments, the fourth pressure is higher than the second pressure. In some embodiments, the fourth temperature is higher than the first temperature. In some embodiments, the fourth pressure is higher than the first pressure. In some embodiments, the third temperature is higher than at least one of the first, second, fourth, fifth, sixth, seventh, eighth, and ninth temperatures. In some embodiments, the third pressure is higher than at least one of the first, second, fourth, fifth, sixth, seventh, eighth, and ninth pressures. In some embodiments, the sixth temperature is lower than or higher than the second temperature. In some embodiments, the sixth temperature is the same as or different from the first temperature. In some embodiments, the sixth temperature is lower than or higher than the first temperature. In some embodiments, the sixth pressure is lower than or higher than the second pressure. In some embodiments, the sixth pressure is the same as or different from the first pressure. In some embodiments, the sixth pressure is lower than or higher than the first pressure. In some embodiments, the sixth temperature is lower than the fourth temperature. In some embodiments, the sixth pressure is lower than the fourth pressure. Other suitable comparisons can be made between numbered temperatures or pressures, and/or numbered flash compositions and flashed vapors, but are not necessarily explicitly disclosed herein, simply for brevity.

The heated composition typically is maintained at the fourth temperature and fourth pressure for about 0.02 s to about 600 s, preferably about 0.1 s to about 60 s. This time period is typically termed the "residence time." The residence time of the heated composition at the fourth temperature and fourth pressure typically is about 0.02 s or more, e.g., about 0.05 s or more, about 0.1 s or more, about 0.15 s or more, about 0.2 s or more, about 0.25 s or more, about 0.3 s or more, about 0.35 s or more, about 0.4 s or more, about 0.45 s or more, about 0.5 s or more, about 0.55 s or more, about 0.6 s or more, about 0.65 s or more, about 0.7 s or more, about 0.75 s or more, about 0.8 s or more, about 0.85 s or more, about 0.9 s or more, about 0.95 s or more, about 1 s or more, about 1.1 s or more, about 1.2 s or more, about 1.3 s or more, about 1.4 or more, about 1.5 s or more, about 1.6 s or more, about 1.7 s or more, about 1.8 s or more, about 1.9 s or more, about 2 s or more, about 2.5 s or more, about 3 s or more, about 3.5 s or more, about 4 s or more, about 4.5 s or more, about 5 s or more, about 5.5 s or more, about 6 s or more, about 6.5 s or more, about 7 s or more, about 7.5 s or more, about 8 s or more, about 8.5 s or more, about 9 s or more, about 9.5 s or more, about 10 s or more, about 15 s or more, about 20 or more, about 25 s or more, about 30 s or more, about 35 s or more, about 40 s or more, about 45 s or more, about 50 s or more, about 55 s or more, about 60 s or more, about 70 s or more, about 80 s or more, about 90 s or more, about 100 s or more, about 110 s or more, about 120 s or more, about 130 s or more, about 140 s or more, about 150 s or more, about 200 s or more, about 250 s or more, about 300 s or more, about 350 s or more, about 400 s or more, about 450 s or more, about 500 s or more, or about 550 s or more. Alternatively, or in addition, the residence time is about 600 s or less, e.g., about 550 s or less, about 500 s or less, about 450 s or less, about 400 s or less, about 350 s or less, about 300 s or less, about 250 s or less, about 200 s or less, about 150 s or less, about 140 s or less, about 130 s or less, about 120 s or less, about 110 s or less, about 100 s or less, about 90 s or less, about 80 s or less, about 70 s or less, about 60 s or less, about 55 s or less, about 50 s or less, about 45 s or less, about 40 s or less, about 35 s or less, about 30 s or less, about 25 s or less, about 20 s or less, about 15 s or less, about 10 s or less, about 9.5 s or less, about 9 s or less, about 8.5 s or less, about 8 s or less, about 7.5 s or less, about 7 s or less, about 6.5 s or less, about 6 s or less, about 5.5 s or less, about 5 s or less, about 4.5 s or less, about 4 s or less, about 3.5 s or less, about 3 s or less, about 2.5 s or less, about 2 s or less, about 1.9 s or less, about 1.8 s or less, about 1.7 s or less, about 1.6 s or less, about 1.5 s or less, about 1.4 s or less, about 1.3 s or less, about 1.2 s or less, about 1.1 s or less, about 1 s or less, about 0.95 s or less, about 0.9 s or less, about 0.85 s or less, about 0.8 s or less, about 0.75 s or less, about 0.7 s or less, about 0.65 s or less, about 0.6 s or less, about 0.55 s or less, about 0.5 or less, about 0.45 s or less, about 0.4 s or less, about 0.35 s or less, about 0.3 s or less, about 0.25 s or less, about 0.2 s or less, about 0.15 s or less, about 0.1 s or less, or about 0.05 s or less. Thus, the residence time of the heated composition at the fourth temperature and fourth pressure can be bounded by any two of the foregoing endpoints. For example, the residence time can be about 0.01 s to about 0.9 s, about 60 s to about 550 s, or about 1.5 s to about 9.5 s.

The invention also provides an apparatus comprising, consisting of, or consisting essentially of:

optionally, a module configured for preheating a composition to form a preheated composition having a second temperature and a second pressure;
    wherein the composition comprises:
        at least one material comprising a polymer, an oligomer, or a combination thereof; and
        a liquid;
    and wherein the composition has a first temperature and a first pressure;
a reactor configured for reacting the composition or the preheated composition with a reactive fluid to form a heated composition having a fourth temperature and a fourth pressure;
    wherein the reactive fluid has a third temperature and a third pressure; a reactive fluid generator comprising:
    optionally, a fluid preheater configured for preheating a fluid to produce a preheated fluid having a fifth temperature and a fifth pressure; and
    a heater configured for heating the fluid or the preheated fluid to form the reactive fluid;
a first flash unit configured for a first flash evaporation to form a first flashed vapor and a first flashed composition, wherein the first flashed composition has a seventh temperature and a seventh pressure, the seventh temperature is less than the fourth temperature, and at least a portion of the first flashed vapor is used for a first useful function;
optionally, a second flash unit configured for a second flash evaporation to form a second flashed vapor and a second flashed composition, wherein the second flashed composition has an eighth temperature and an eighth pressure, the eighth temperature is less than the fourth temperature, and optionally at least a portion of the second flashed vapor is used for a fourth useful function, wherein the fourth useful function is the same as or different from the first useful function;
optionally, at least one clean vapor exchanger, wherein at least one of the first flashed vapor and the second flashed vapor indirectly provides heat to a clean fluid in the clean vapor exchanger thereby producing a first clean vapor and/or a second clean vapor, respectively, and optionally at least a portion of the first clean vapor and/or the second clean vapor is used for a second useful function and or fifth useful function, respectively, wherein the second useful function is the same as or different from the first, fourth, and/or fifth useful functions; and
optionally, at least one indirect heat exchanger comprising a heat transfer fluid, wherein the at least one heat exchanger is configured for indirectly cooling a process stream processed by the apparatus, thereby producing an energized heat transfer fluid, and the energized heat transfer fluid optionally is used for a third useful function, wherein the third useful function is the same as or different from the first, second, fourth, and fifth useful functions.

The temperatures, pressures, and useful functions described elsewhere herein with respect to the inventive method are applicable to the temperatures, pressures, and useful functions, respectively, described for the inventive apparatus (e.g., the ranges disclosed herein for the first temperature of the method are applicable to the first temperature for the apparatus, the fourth useful function disclosed herein for the method are applicable to the fourth useful function for the apparatus, and so on).

The components of the inventive apparatus can be arranged in any suitable manner, relative to the flow direction of the process stream(s). In some embodiments, the first flash unit can be located before or after the second flash unit. In some embodiments, the heat exchanger can be located before or after the first flash unit. In some embodiments, the heat exchanger can be located before or after the second flash unit. In some embodiments, a heat exchanger is not employed. In some embodiments, a second flash unit is not employed. In some embodiments, three, four, five, six, seven, or eight flash units can be employed. In some embodiments, two, three, four, five, six, seven, or eight heat exchangers can be employed.

The first flash unit, second flash unit, and indirect heat exchanger, if employed, are typically used in a cooling stage to cool the heated composition.

Figure 5:
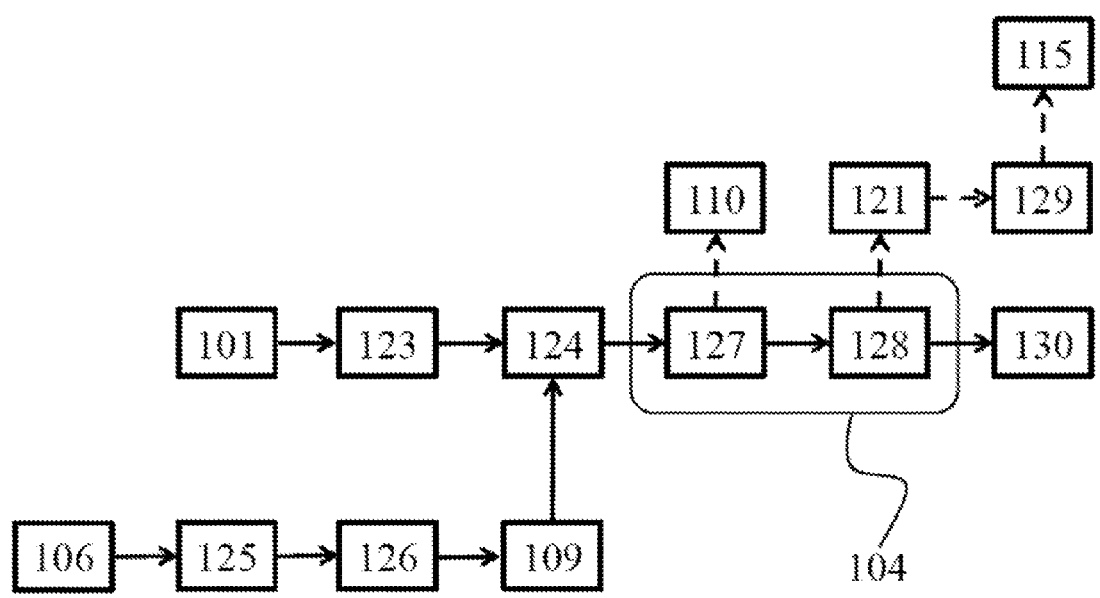
FIG. 5 illustrates an embodiment of an apparatus of the invention. The apparatus comprises an optional preheater, a reactor, a first flash unit, and a second flash unit. The apparatus also comprises an optional fluid preheater, and a fluid heater. The second flashed vapor issuing from the second flash unit is fed to an indirect clean vapor exchanger, thereby producing clean vapor, which optionally can be used for a fifth useful function.

FIG. 5 depicts an embodiment of the invention. FIG. 5 is representative of an apparatus of the invention, although alternate embodiments are contemplated in accordance with the disclosures herein. Dashed lines generally indicate the flow path of energy recovered in the process. A composition (101) is provided and optionally is preheated in an optional first preheater (123) to form a preheated composition (not shown). The composition (101) or preheated composition is heated with a reactive fluid (109) in reactor (124) to form a heated composition (not shown). The heated composition is cooled in a cooling stage (104) to form a cooled composition (not shown). Typically, energy is recovered during the cooling stage. The cooled composition optionally is contained in optional receiving vessel (130). The cooling stage (104) comprises a first flash unit (127) and a second flash unit (128). The first flash unit (127) controls a first flash evaporation and produces a first flashed vapor (110) and a first flashed composition (not shown). At least a portion of the first flashed vapor (110) is used to perform a first useful function (not shown). The second flash unit (128) controls a second flash evaporation and produces a second flashed vapor (121) and a second flashed composition (not shown). At least a portion of the second flashed vapor (121) is fed to a clean vapor exchanger (129) to indirectly generate clean vapor (115). Optionally, at least a portion of clean vapor (115) can be used for a useful function (not shown). The reactive fluid (109) is produced in a reactive fluid generator by a process comprising providing a fluid (106), optionally preheating the fluid (106) in an optional second preheater (125) to form a preheated fluid (not shown), and then heating the fluid (106) or the preheated fluid in a heater (126) to form the reactive fluid (109).

When ranges are used herein for conditions, such as temperature or pressure, all combinations and sub-combinations of the ranges therein are intended to be, and are, included.

The disclosures of each patent, patent application, and publication cited or described in this document are hereby incorporated herein by reference, in their entireties.

Those skilled in the art will appreciate that numerous changes and modifications can be made to the preferred embodiments of the invention and that such changes and modifications can be made without departing from the spirit of the invention.

The invention claimed is:

1. A method comprising:
   providing a composition at a first temperature and a first pressure, wherein the composition comprises:
     at least one material selected from the group consisting of a polymer, an oligomer, and combinations thereof; and
     water;
   optionally, preheating the composition in a first preheating stage to form a preheated composition, wherein the preheated composition is characterized by a second temperature and a second pressure;
   heating the composition or the preheated composition with a reactive fluid in a first heating stage to form a heated composition comprising at least one compound selected from the group consisting of $C_5$ monosaccharides or oligosaccharides, $C_6$ monosaccharides or oligosaccharides, depolymerization products of a plastic, or combinations thereof, wherein the reactive fluid comprises a sub-critical, near-critical, or supercritical fluid, and is characterized by a third temperature and a third pressure, and the heated composition is characterized by a fourth temperature and a fourth pressure;
   cooling the heated composition in a cooling stage comprising a first flash evaporation to produce a first flashed vapor and a first flashed composition; and
   performing a first useful function with at least a portion of the first flashed vapor, wherein the first useful function
   (a) is selected from the group consisting of indirectly preheating the composition, indirectly preheating the fluid, and combinations thereof; or
   (b) is indirectly generating a first clean vapor, wherein at least a portion of the first clean vapor is used to perform a second useful function selected from the group consisting of directly or indirectly preheating the composition, directly or indirectly preheating the fluid, and combinations thereof;
   wherein a process for producing the reactive fluid comprises:
     providing a fluid;
     optionally, preheating the fluid in a second preheating stage to produce a preheated fluid having a fifth temperature and a fifth pressure; and
     heating the fluid or the preheated fluid in a second heating stage to produce the reactive fluid; and
   wherein at least one of the first and second preheating stages is performed.

2. The method of claim 1, wherein the composition is a slurry.

3. The method of claim 1, wherein at least a portion of the first flashed vapor is condensed to form a condensate, and wherein the condensate is used for a function selected from the group consisting of forming the composition, directly cooling the heated composition prior to or during the cooling stage, directly cooling the first flashed composition, and combinations thereof.

4. The method of claim 1, wherein the method does not employ indirect cooling using a heat transfer fluid.

5. The method of claim 1, wherein the method is continuous.

6. The method of claim 1, wherein the method is carried out substantially free of exogenous acid.

7. The method of claim 1, wherein
   the third temperature is about 350° C. to about 600° C.

8. The method of claim 1, further comprising:
   transforming at least one of the reaction products into butanol, ethanol, or succinic acid.

9. The method of claim 1, wherein
   the at least one material is selected from the group consisting of biomass, cellulosic material, paper, cardboard, lignocellulosic material, municipal waste, municipal solid waste, manufacturing waste, food waste, agricultural residue, corn stover, sugarcane bagasse, grass, bark, dedicated energy crops, wood residue, sawmill and paper mill discards, hardwood, softwood, plastic, waste plastic, synthetic polymers or oligomers, natural polymers or oligomers, and combinations thereof.

10. The method of claim 1, wherein:
    in the cooling stage, the first flash evaporation is preceded by or followed by indirect cooling using a heat transfer fluid, thereby producing an energized heat transfer fluid and a heat exchanged composition.

11. The method of claim 10, wherein the energized heat transfer fluid is used to perform a third useful function selected from the group consisting of indirectly preheating the composition, indirectly preheating the fluid, and combinations thereof.

12. The method of claim 10, wherein, (i) when the heat-exchanged composition has a lower temperature than the first flashed composition, the heat-exchanged composition is used to cool the first flashed composition, or (ii) when the first flashed composition has a lower temperature than the heat-exchanged composition, the first flashed composition is used to cool the heat-exchanged composition.

13. The method of claim 10, wherein the energized heat transfer fluid is used to perform a third useful function comprising indirectly preheating at least one of the composition and the fluid, and optionally, wherein the heat transfer fluid is circulated in a continuous loop between the indirect cooling and the indirect preheating.

14. The method of claim 1, wherein, in the cooling stage, the first flash evaporation is preceded by or followed by a second flash evaporation, thereby producing a second flashed vapor and a second flashed composition.

15. The method of claim 14, wherein at least a portion of the second flashed vapor is used to perform a fourth useful function is selected from the group consisting of indirectly preheating the composition, indirectly preheating the fluid, and combinations thereof.

16. The method of claim 14, wherein at least a portion of the second flashed vapor is used to perform a fourth useful function selected from the group consisting of feeding to a co-located plant, electricity generation, evaporation, heating process streams, vacuum generation, and combinations thereof.

17. The method of claim 14, wherein at least a portion of the second flashed vapor is condensed to form a condensate, and wherein the condensate is used for a function selected from the group consisting of forming the composition, directly cooling the heated composition prior to or during the cooling stage, directly cooling the first flashed composition, directly cooling the second flashed composition, and combinations thereof.

18. The method of claim 14, wherein, (i) when the second flashed composition has a lower temperature than the first flashed composition, the second flashed composition is used to cool the first flashed composition, or (ii) when the first flashed composition has a lower temperature than the second flashed composition, the first flashed composition is used to cool the second flashed composition.

19. The method of claim 14, wherein at least a portion of the second flashed vapor is used to perform a fourth useful function of indirectly generating a second clean vapor, and at least a portion of the second clean vapor is used to perform a fifth useful function.

20. The method of claim 19, wherein the fifth useful function is selected from the group consisting of directly or indirectly preheating the composition, directly or indirectly preheating the fluid, and combinations thereof.

21. The method of claim 19, wherein (i) the first flash evaporation is followed by the second flash evaporation, and (ii) the first useful function is at least one of indirectly preheating the composition and indirectly preheating the fluid.

22. The method of claim 20, wherein (i) the first flash evaporation is preceded by the second flash evaporation, (ii) the first useful function comprises indirectly generating a first clean vapor, and (iii) at least a portion of the first clean vapor is used to perform a second useful function.

23. The method of claim 1, wherein the fourth temperature is about 300° C. to about 550° C.

24. The method of claim 1, wherein the fourth pressure is about 1000 psia to about 5500 psia.

25. The method of claim 19, wherein the fifth useful function is directly heating a process stream.

26. The method of claim 21, wherein the fifth useful function is directly heating a process stream.

27. The method of claim 21, wherein the first useful function is indirectly preheating the fluid, and the fifth useful function is directly heating a process stream.

28. The method of claim 15, wherein (i) the first flash evaporation is preceded by the second flash evaporation, (ii) the first useful function comprises indirectly generating a first clean vapor, (iii) at least a portion of the first clean vapor is used to perform a second useful function, and (iv) the second useful function is directly heating a process stream.

\* \* \* \* \*